United States Patent
Inoue et al.

(10) Patent No.: US 8,259,657 B2
(45) Date of Patent: Sep. 4, 2012

(54) METHOD FOR MEASURING CHANNEL QUALITY AND BASE STATION IN MOBILE COMMUNICATIONS SYSTEM

(75) Inventors: Takamichi Inoue, Tokyo (JP); Yoshikazu Kakwa, Tokyo (JP)

(73) Assignee: NEC Corporation, Tokyo (JP)

( * ) Notice: Subject to any disclaimer, the term of this patent is extended or adjusted under 35 U.S.C. 154(b) by 1320 days.

(21) Appl. No.: 11/812,424

(22) Filed: Jun. 19, 2007

(65) Prior Publication Data

US 2007/0293233 A1    Dec. 20, 2007

(30) Foreign Application Priority Data

Jun. 19, 2006    (JP) ................................. 2006-168476

(51) Int. Cl.
*H04W 4/00*    (2009.01)
(52) U.S. Cl. ..... 370/329; 370/330; 370/332; 455/452.2; 455/67.11; 455/423; 455/67.14
(58) Field of Classification Search .................. 370/208, 370/329, 330, 436, 332; 455/450–452.2, 455/67.11, 67.13, 561, 423, 67.14, 69
See application file for complete search history.

(56) References Cited

U.S. PATENT DOCUMENTS

| 2004/0213197 | A1* | 10/2004 | Zimmerman et al. ........ 370/346 |
| 2005/0286408 | A1* | 12/2005 | Jin et al. ........................ 370/208 |
| 2006/0153061 | A1  | 7/2006  | Nishio |
| 2007/0004465 | A1* | 1/2007  | Papasakellariou et al. ... 455/571 |

FOREIGN PATENT DOCUMENTS

| EP | 1630991 | 3/2006 |
| KR | 2005-0083880 | 8/2005 |

OTHER PUBLICATIONS

Korean Patent Office issued an Korean Office Action on Nov. 25, 2008, Application No. 20070059753.
A. Jalali et al., "Data Throughput of CDMA-HDR a High Efficiency-High Data Rate Personal Communication Wireless System", pp. 1-5; Qualcomm, Inc., San Diego, California USA, 2000.
"R1-060925: Comparison of Proposed Uplink Pilot Structures for SC-OFDMA" Agenda item: 10.2.1, Mar. 27-31, 2006, pp. 1-15; 3GPP TSG RAN WG1#44bis; Athens, Greece.
"Channel-Dependent Scheduling Method for Single-Carrier FDMA Radio Access in Evolved UTRA Uplink" Agenda Item: 10.3, Aug. 29-Sep. 2, 2005, pp. 1-10; 3GPP TSG RAN WG1 #42 on LTE; London, UK.
"Orthogonal Pilot Channel Structure for E-UTRA Uplink", Agenda Item: 13.2.2.2, Feb. 13-17, 2006, pp. 1-7; SGPP TSG RAN WG1 Meeting #44; Denver, Colorado, USA.
Extended European Search Report dated Oct. 27, 2011, Application No. 07011910.2.

(Continued)

*Primary Examiner* — Marcos Torres
(74) *Attorney, Agent, or Firm* — Young & Thompson

(57) ABSTRACT

A channel quality measurement method that accomplishes efficient channel quality measurement for each mobile station is presented. In a frequency band including a plurality of frequency blocks, a base station measures the channel quality of each of a plurality of mobile stations. With respect to each mobile station, when a pilot resource for demodulation is not allocated in at least one of the frequency blocks, the base station allocates a specific pilot resource for channel quality measurement in that frequency block. The channel quality of each mobile station in the plurality of frequency blocks is measured by using one or both of the pilot resource for demodulation and the dedicated pilot resource for channel quality measurement.

31 Claims, 18 Drawing Sheets

OTHER PUBLICATIONS

Qualcomm Europe: "Uplink Broadband Pilot Structure", 3GPP Draft; R1-060474, 3rd Generation Partership Project (3GPP), Mobile Competence Centre; 650, Route des Lucioles; F-06921 Sophia-Antipolis Cedex; France, vol. RAN WG1, no. Denver, USA; 20060209, Feb. 9, 2006, XP050101414.

LG Electronics: "Uplink pilot for channel quality measurement", 3GPP Draft; R1-060919_Uplink CQ Pilot_with TP, 3rd Generation Partnership Project (3GPP), Mobile Competence Centre; 650, Route des Lucioles; F-06921 Sophia-Antipolis Cedex; France, vol. RAN WG1, no. Athens, Greece; 20060321, Mar. 21, 2006, XP050101825.

* cited by examiner

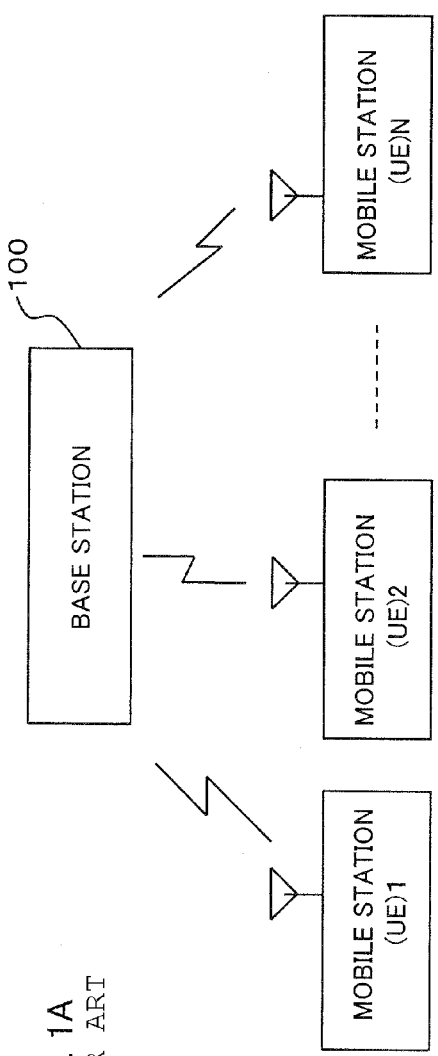

EXEMPLARY EMBODIMENT

BAND FOR UE'S PILOT SIGNAL : VARIABLE

BAND FOR UE'S PILOT SIGNAL : INVARIANT

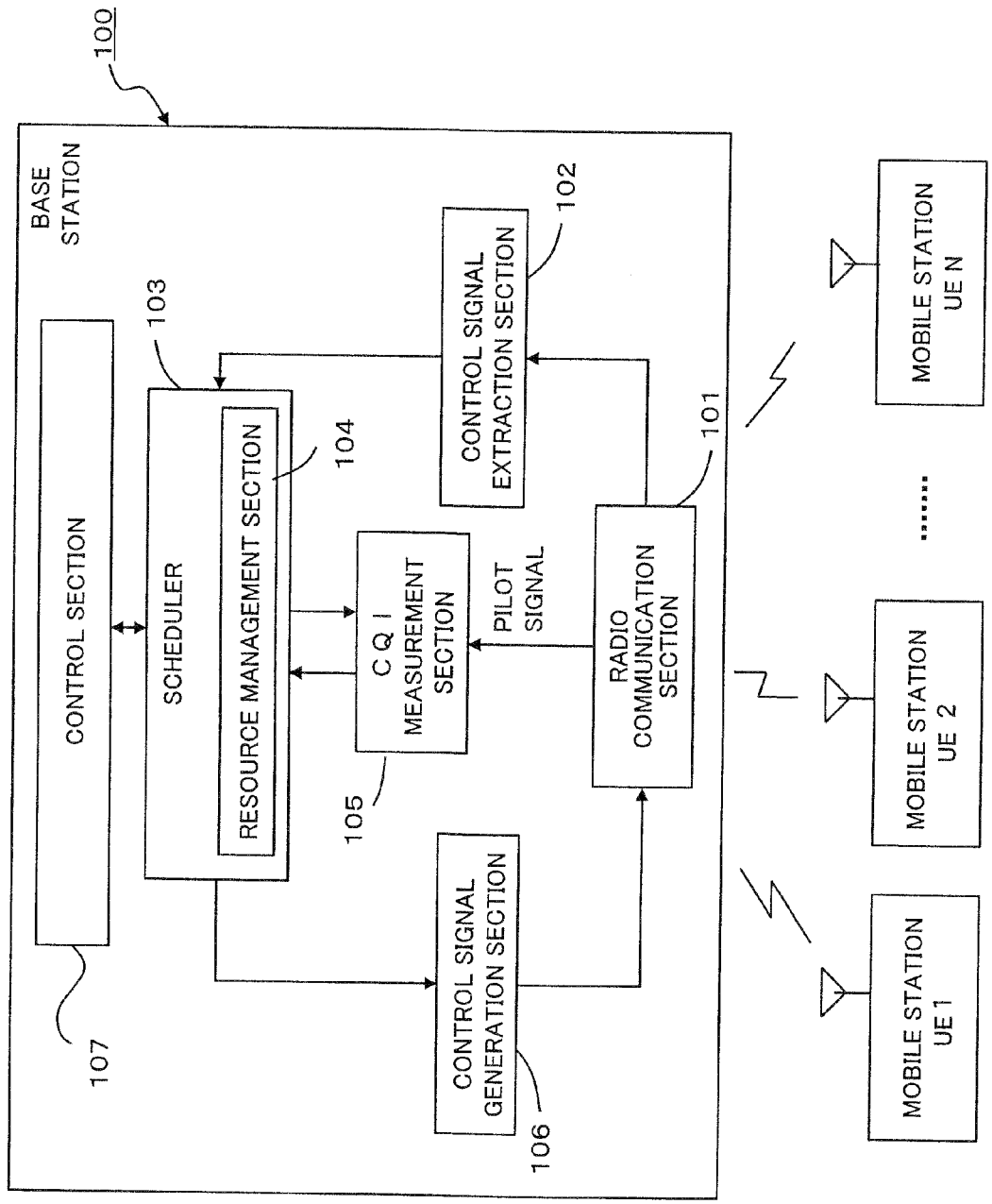

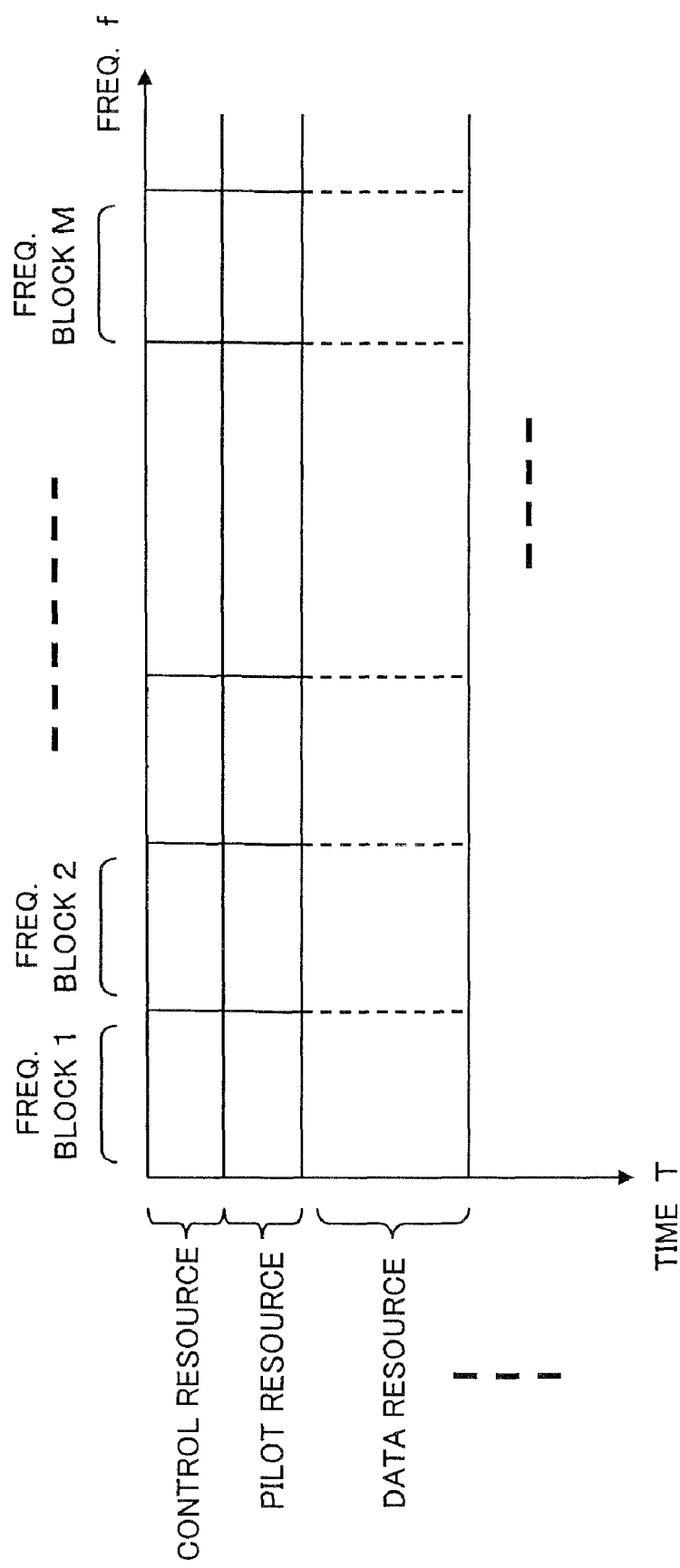

FIG. 5

RESOURCE MANAGEMENT TABLE

|  |  | FREQ. BLOCK 1 | FREQ. BLOCK 2 | FREQ. BLOCK 3 | ... | FREQ. BLOCK M |
|---|---|---|---|---|---|---|
| UE 1 | SCHEDULING BAND | ○ | ○ | ○ |  | — |
|  | PRESENCE OF PILOT | ○ | ○ | — |  | — |
| UE 2 | SCHEDULING BAND | ○ | ○ | — |  | — |
|  | PRESENCE OF PILOT | — | — | — |  | — |
| UE 3 | SCHEDULING BAND | ○ | ○ | — |  | ○ |
|  | PRESENCE OF PILOT | ○ | ○ | ○ |  | ○ |
| UE 4 | SCHEDULING BAND | — | — | ○ |  | — |
|  | PRESENCE OF PILOT | — | — | ○ |  | — |
| ..... |  |  |  |  |  |  |
| UE N | SCHEDULING BAND | — | — | ○ |  | ○ |
|  | PRESENCE OF PILOT | — | — | ○ |  | — |

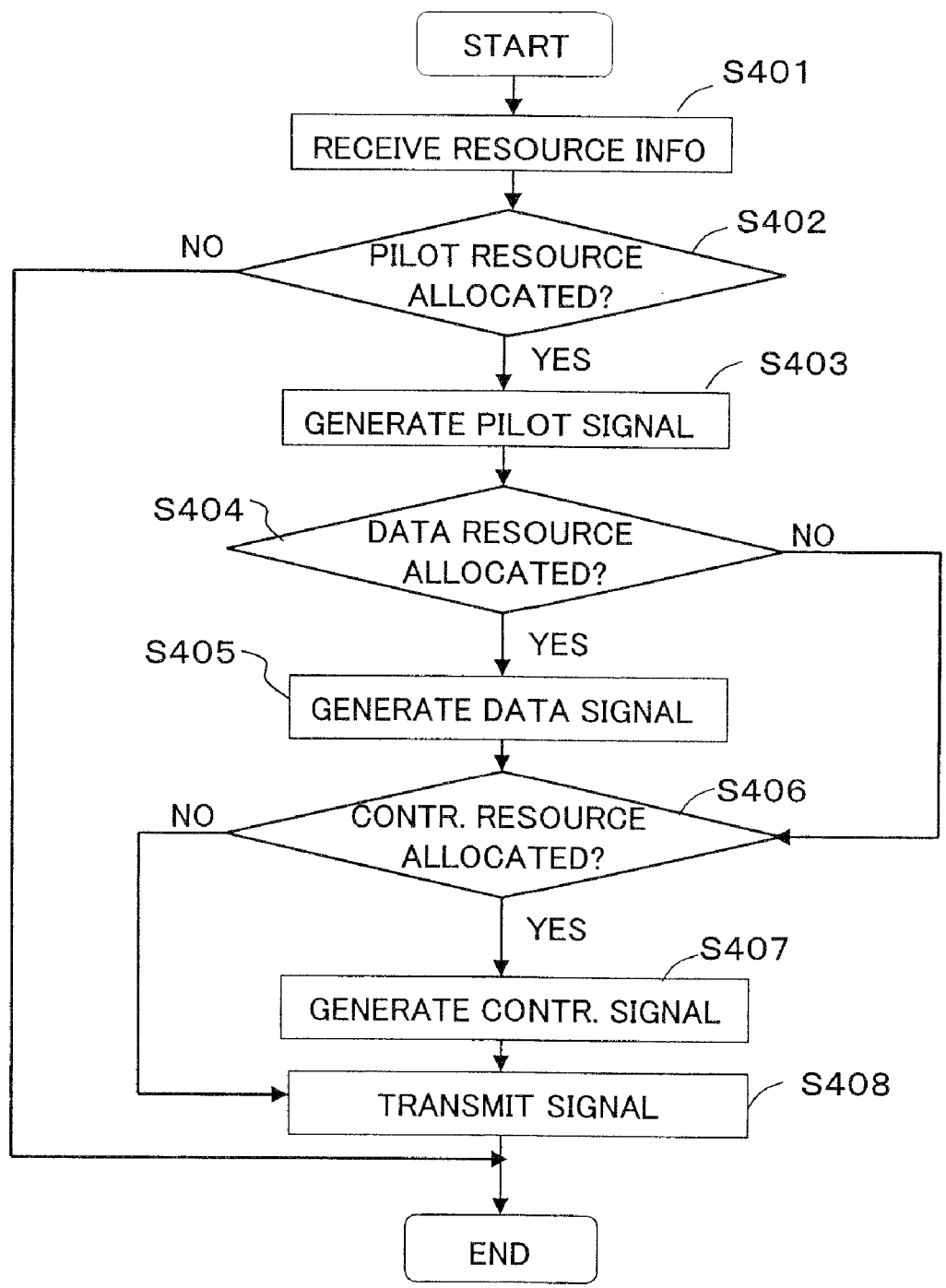

SECOND EXAMPLE

FIG. 11
SECOND EXEMPLARY EMBODIMENT
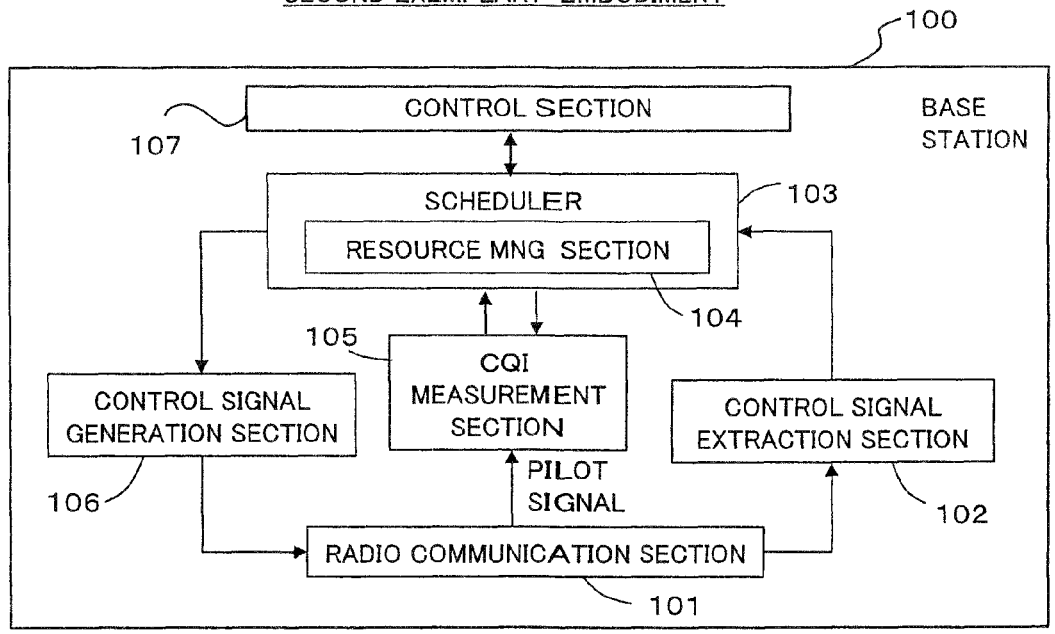
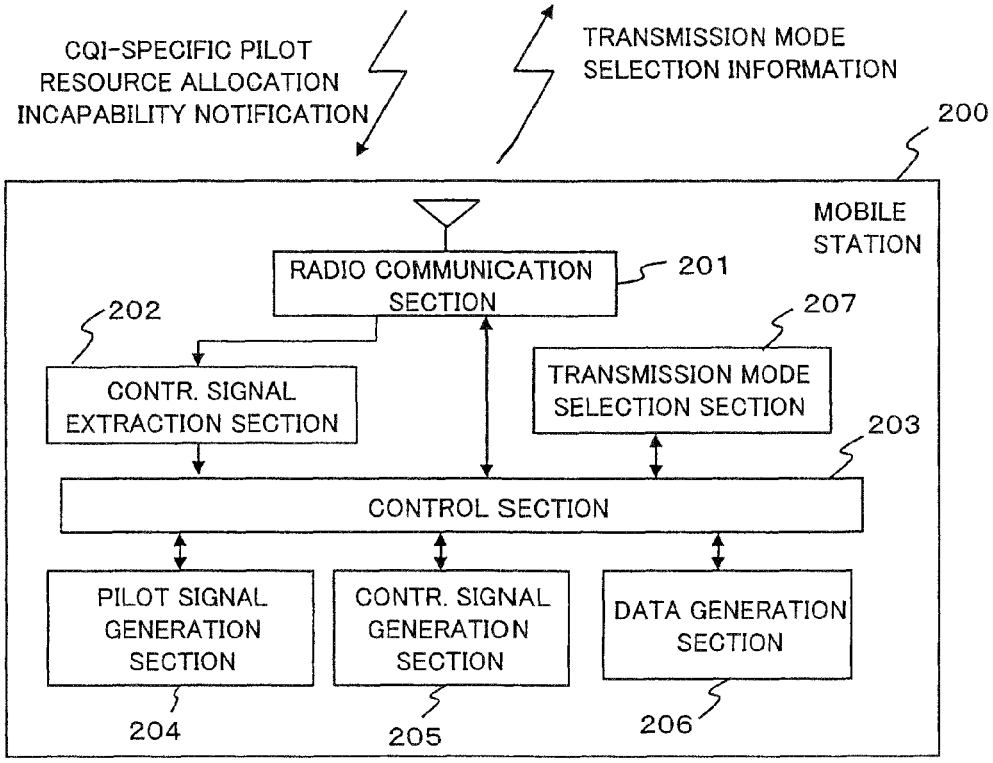

BASE STATION
SECOND
EXEMPLARY EMBODIMENT

FIG. 16
THIRD EXEMPLARY EMBODIMENT
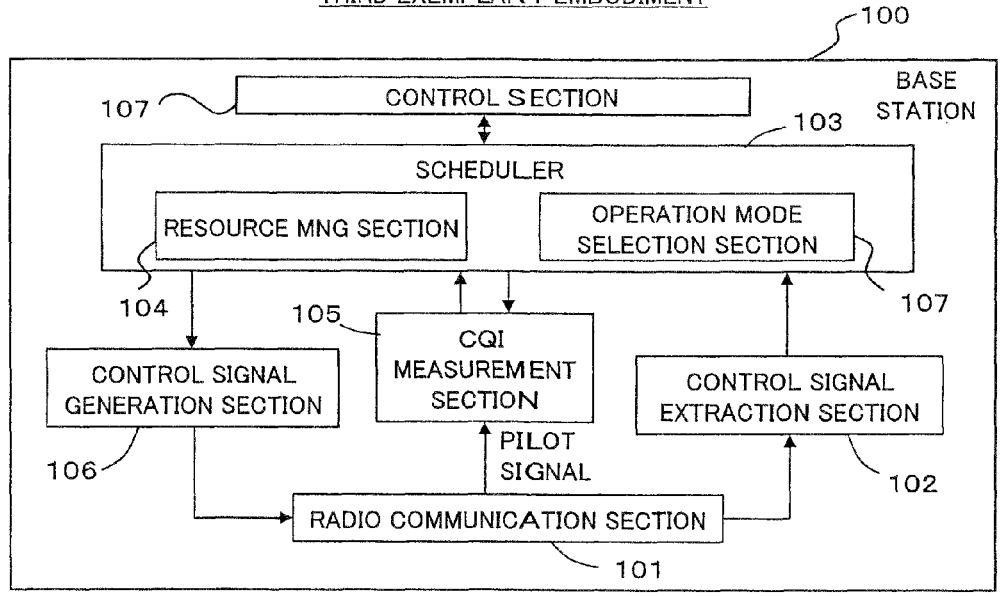
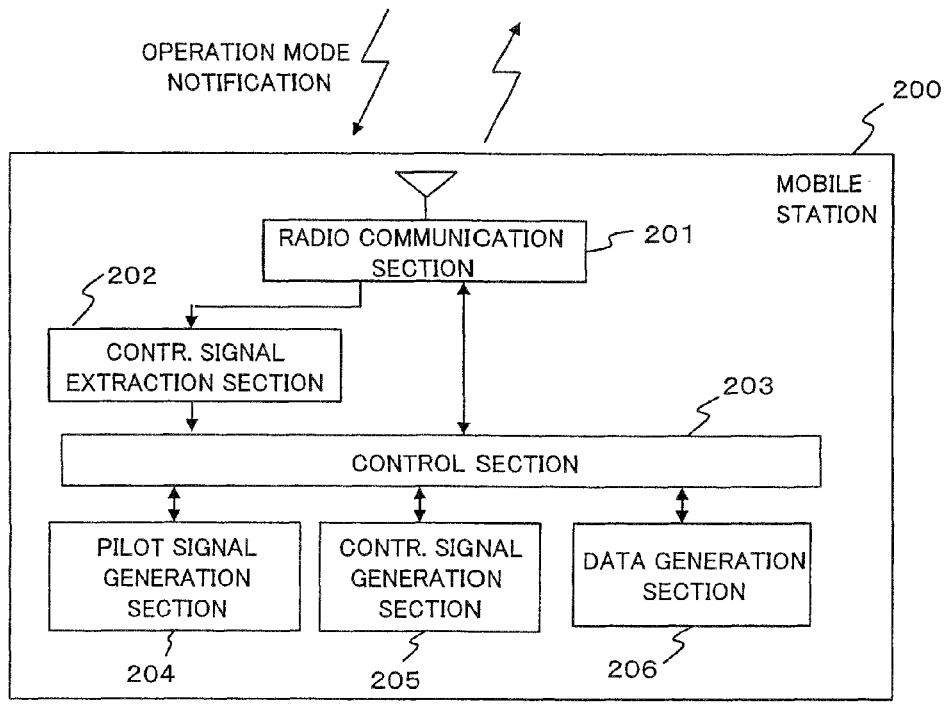

BASE STATION

METHOD FOR MEASURING CHANNEL QUALITY AND BASE STATION IN MOBILE COMMUNICATIONS SYSTEM

BACKGROUND OF THE INVENTION

1. Field of the Invention

This application is based upon and claims the benefit of priority from Japanese Patent Application No. 2006-168476, filed on Jun. 19, 2006, the disclosure of which is incorporated herein in its entirety by reference.

The present invention relates to a mobile communications system and, more particularly, to techniques for measuring the channel quality of each mobile station, pilot-resource allocating techniques, and a base station using these techniques.

2. Description of the Related Art

A base station in a mobile communications system performs resource scheduling to enhance the efficiency of radio resources. The scheduling methods can be classified into two broad types; one is channel-independent scheduling by which a resource is allocated periodically, for example by round-robin, irrespective of channel quality; the other one is channel-dependent scheduling by which, taking channel quality into account, a resource is allocated to a mobile station with good channel quality. Since the channel-dependent scheduling has great multiuser diversity effect in comparison with the channel-independent scheduling, it is reported that the channel-dependent scheduling can provide a greater throughput (see Jalali, A., Padovani, R., and Pankaj, R., "Data throughput of CDMA-HDR a high efficiency-high data rate personal communication wireless system," Proceedings of IEEE VTC2000-Spring, May 2000, pp. 1854-1858). Additionally, for the channel-dependent scheduling, a maximum CIR (Carrier-to-Interference power Ratio) method, proportional fairness method, and the like are proposed.

To perform the channel-dependent scheduling, a base station needs to measure the quality of a channel (hereinafter, referred to as CQI: Channel Quality Indicator) between the base station and each mobile station (UE: User Equipment). In the channel-dependent scheduling, a resource is allocated to a mobile station with the best CQI. Therefore, CQI measurement needs to be done over a range, as a scheduling band, including not only a frequency band (frequency block) where data transmission is being performed, but also frequency blocks having the possibility for data transmission. For example, see 3GPP R1-050701 (NTT DoCoMo et al., "Channel-Dependent Scheduling Method for Single-Carrier FDMA Radio Access in Evolved UTRA Uplink," Aug. 29-Sep. 2, 2005)). it is proposed that CQI measurement is made by utilizing a pilot signal (also referred to as reference signal) multiplexed on an uplink from each mobile station to the base station (see 3GPP R1-060925 (Texas Instruments, "Comparison of Proposed Uplink Pilot Structures for SC-OFDMA," March 2006)). In other words, a pilot signal for demodulating an uplink data signal and a control signals, is also used to measure CQI.

According to such a method, the base station measures CQI based on pilot signals from the mobile stations and allocates a data resource to a mobile station with the best CQI. If the base station has downlink data to transmit, the base station allocates a control resource for transmitting a control signal for the downlink data. If an allocation of the data resource or control resource takes place, CQI measurement is carried out by utilizing the pilot signal for demodulating the corresponding data or control signal. On the other hand, when a mobile station receives control information regarding resources from the base station, the mobile station transmits a data signal, control signal, and pilot signal to the base station in accordance with the received resource information.

However, according to the above-described method, the pilot resource cannot be efficiently allocated, as will be described below. Hereinafter, this will be described with reference to FIGS. 1A, 1B and 2A.

FIG. 1A is a block diagram showing an example of a mobile communications system, and FIG. 1B is a table showing the transmission states of mobile stations in a frequency block. Here, it is assumed that N mobile stations (UEs) are connected to a single base station 100.

In this case, the transmission states of the mobile stations in a frequency block can be classified into four groups a to d, as shown in FIG. 1B. In a certain frequency block, mobile stations belonging to the groups a to c are transmitting any one or both of an uplink data signal and a control signal. Therefore, CQI measurement can be performed for these mobile stations by using the pilot signals for demodulating these signals. However, a mobile station belonging to the group d has sent an uplink-data transmission request (hereinafter, also referred to as resource request) to the base station but is still waiting for transmission of an uplink data signal, even without transmitting an uplink control signal yet. To perform CQI measurement for the mobile stations including such a mobile station belonging to the group d in a scheduling band, according to a hitherto-used technique, pilot signals are transmitted across a bandwidth wider than the bandwidth where all the mobile stations are actually transmitting data signals and control signals, which will be described below more specifically.

FIG. 2A is a diagram schematically showing the allocation of a resource for CQI measurement according to a hitherto-used technique. The numerals after "UE" in FIG. 2A represent the mobile station numbers (in the drawings, a mobile station is expressed as UE where appropriate). In this example, a control signal, pilot signal, and data signal are multiplexed in time division scheme (TDM: time division multiplexing), and the resources to be allocated for these signals are referred to as a control resource, pilot resource, and data resource, respectively. Moreover, in the control resource, control signals from a plurality of mobile stations are multiplexed by means of distributed FDM (frequency division multiplexing) using the entire scheduling band, and in the pilot resource, pilot signals from the plurality of mobile stations are multiplexed in code division scheme (CDM: code division multiplexing). A control signal in this example is an uplink control signal regarding a downlink data signal (called data non-associated control signaling) and contains downlink CQI, ACK/NACK indicating whether or not downlink packets have been correctly received, or the like.

Although the transmission amount of a control signal is smaller than that of a data signal, the control signal needs to be transmitted periodically. As shown in FIG. 2A, in resource allocation according to the hitherto-used technique, every mobile station transmits a pilot signal using the entire scheduling band in which CQI is measured. Accordingly, as to mobile stations belonging to the groups a to c in FIG. 1B, each pilot signal is used by the base station for two purposes: modulation of a data signal and/or control signal, and CQI measurement. However, as to those belonging to the group d, each pilot signal is similarly transmitted only for CQI measurement over the scheduling band. That is, a pilot resource for no particular use is allocated to these mobile stations. In addition, a pilot resource for no particular use is sometimes allocated similarly even to a mobile station belonging to any one of the groups a to c, because the same entire band is used to transmit pilot signals. As a result, resource allocation techniques as shown in FIG. 2A have had the problem that the overhead is large and the pilot resource cannot be efficiently allocated.

In addition, studies have been made to achieve pilot signal orthogonality among mobile stations, with it being known that there is a limit to the number of mobile stations which can make orthogonal signals (see 3GPP R1-060319 (NTT DoCoMo et al., "Orthogonal Pilot Channel Structure for E-UTRA Uplink," February 2006)). Due to this limit, the problem also arises that the number of mobile stations for which the base station performs CQI measurement becomes smaller when a pilot signal is used both for demodulation and CQI measurement.

SUMMARY OF THE INVENTION

An object of the present invention is to provide a mobile communications system, a channel quality measurement method, and a base station that enable efficient measurement of the channel quality of each mobile station.

A channel quality measuring method according to the present invention measures channel quality for each of a plurality of mobile stations at a base station in a frequency band including a plurality of frequency blocks, by a) allocating a pilot resource for demodulation to a mobile station which performs transmission of uplink data signal and/or control signal in any one of the plurality of frequency blocks; b) allocating a pilot resource specific to channel quality measurement to a mobile station which waits for uplink data signal transmission scheduling; and c) measuring channel quality for each of the plurality of mobile stations using the pilot resource for demodulation and/or the pilot resource specific to channel quality measurement.

As described above, according to the present invention, the pilot resource specific to channel quality measurement is not prepared for every mobile station. In a frequency block in which channel quality measurement is possible using a demodulation pilot signal, the demodulation pilot signal is used to measure the channel quality. In a frequency block in which the demodulation pilot signal is not transmitted, the pilot signal specific to channel quality measurement is transmitted to measure the channel quality. Thus, it is possible to achieve efficient channel quality measurement, with the small overhead across the whole bandwidth composed of a plurality of frequency blocks.

BRIEF DESCRIPTION OF THE DRAWINGS

FIG. 1A is a block diagram showing an example of a mobile communications system.

FIG. 1B is a table showing the transmission states of mobile stations in a frequency block.

FIG. 3 is a block diagram showing a configuration of a base station in a mobile communications system according to the first exemplary embodiment of the present invention.

FIG. 4 is a schematic diagram showing a structure of resource blocks adopted in the first exemplary embodiment.

FIG. 5 is a schematic diagram showing an example of information stored in a resource management table used by a resource management section 104.

FIG. 8 is a flow chart showing the operation of the mobile station shown in FIG. 7.

FIG. 11 is a block diagram showing configurations of a base station and mobile station in a mobile communications system according to a second exemplary embodiment of the present invention.

FIG. 16 is a block diagram showing configurations of a base station and mobile station in a mobile communications system according to a third exemplary embodiment of the present invention.

DETAILED DESCRIPTION OF THE PREFERRED EMBODIMENTS

1. First Exemplary Embodiment 1.1) Resource Allocation

Figure 2B:
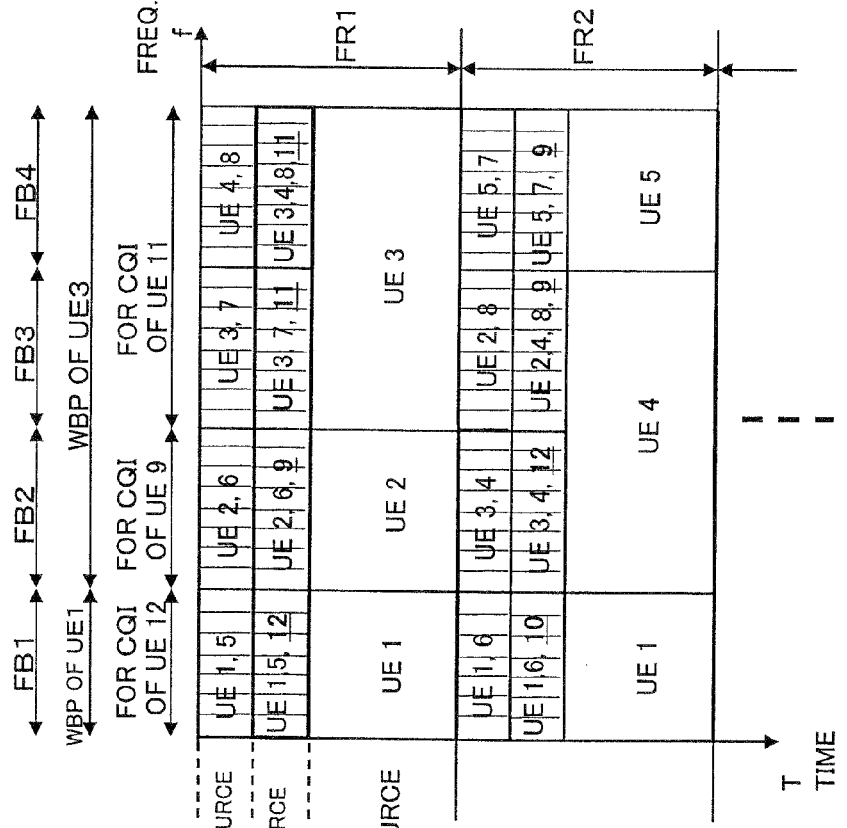
FIG. 2B is a diagram schematically showing the allocation of a resource for CQI measurement according to a first exemplary embodiment of the present invention.

FIG. 2B is a diagram schematically showing the allocation of a resource for channel quality measurement according to a first exemplary embodiment of the present invention. In this exemplary embodiment, a control signal, pilot signal (also referred to as reference signal), and data signal are time-division-multiplexed (TDM) in each frame (also referred to as sub-frame). The resources to be allocated in one frame FR, in each frequency block FB, are referred to as a control resource, a pilot resource, and a data resource. Note that a control signal in this example is an uplink control signal regarding a downlink data signal (called data non-associated control signaling) and contains a downlink CQI, ACK/NACK indicating whether or not downlink packets have been correctly received, or the like.

In addition, four frequency bands (frequency blocks FB1 to FB4) are illustrated here to simplify the description. However, the number of frequency blocks is not limited to four as in this example, and the entire band may include any other number of multiple frequency blocks. Moreover, each frequency block FB may be a sub-carrier frequency block including a plurality of sub-carriers. As for the multiplexing methods, distributed FDM can be used in the control resource, and code division multiplex (CDM) or distributed FDM can be used in the pilot resource.

According to the first exemplary embodiment of the present invention, in a range of a scheduling band where CQI can be measured with a pilot signal for demodulation (hereinafter, referred to as demodulation pilot signal), the modulation pilot signal is utilized to measure CQI, and in another range of the scheduling band where a demodulation pilot signal is not transmitted, a pilot signal specific to CQI measurement (hereinafter, referred to as CQI-specific pilot signal) is transmitted to measure CQI. A CQI-specific pilot signal is also called "sounding reference signal". According to the present embodiment, in the case where a modulation pilot signal is also used to measure CQI, a CQI-specific pilot signal does not need to be transmitted.

Incidentally, if there is a surplus of the resource, a pilot resource for CQI measurement can be allocated even in a frequency block where a mobile station is transmitting a control signal and/or data (i.e., any of the frequency blocks corresponding to the groups a, b and c in FIG. 1B). The same will apply in other exemplary embodiments described below.

1.2) Resource Allocation Control in Frame

Referring to FIG. 2B, the control resource, pilot resource, and data resource are time-division-multiplexed in each of the frequency blocks FB1 to FB4 in one frame FR. A demodulation pilot signal is transmitted when an uplink control signal or uplink data signal is transmitted. Therefore, to a mobile station to which the control resource is allocated in a certain frequency block, the pilot resource is also allocated in the same frequency block, and to a mobile station to which the data resource is allocated in a certain frequency block, the pilot resource is also allocated in the same frequency block.

In the case shown in FIG. 2B for example, in the frequency block FB1 in the frame FR1, the control resource is allocated to the mobile stations UE1 and UE5, the pilot resource is allocated to the mobile stations UE1, UE5, and UE12, and the data resource is allocated to the mobile station UE1. That is, the mobile station UE1 is in the transmission state belonging to the group a in FIG. 1B. Uplink data and a control signal from the mobile station UE1 are demodulated by using a pilot signal, and the same pilot signal is also used to measure CQI of the mobile station UE1. The bandwidth of the pilot resource is identical to that of the data resource.

Moreover, the mobile station UE5 is in the transmission state belonging to the group c in FIG. 1B. A control signal from the mobile station UE5 is demodulated by using a pilot signal, and the same pilot signal is used to measure CQI of the mobile station UE5.

On the other hand, the mobile station UE12, underlined in FIG. 2B, is in the transmission state belonging to the group d in FIG. 1B and has sent an uplink-data transmission request (hereinafter, also referred to as resource request). However, the mobile station UE12 has transmitted neither uplink control signal nor uplink data signal and accordingly has transmitted no demodulation pilot signal. To the mobile station UE12 in such a state, a base station according the first exemplary embodiment of the present invention allocates a pilot resource specific to channel quality measurement (hereinafter, referred to as CQI-specific pilot resource) in accordance with the undermentioned allocation control, whereby CQI of the mobile station UE12 can be measured. A CQI-specific pilot resource may be also called "sounding reference resource". In the drawings, a mobile station to which the CQI-specific pilot resource is allocated as described above are represented by its reference numeral underlined.

In addition, referring to the mobile station UE3, the control resource is allocated to the mobile station UE3 in the frequency block FB3, and the pilot resource and data resource are allocated to the mobile station UE3 in the frequency blocks FB3 and FB4. That is, the mobile station UE3 is in the transmission state belonging to the group a in FIG. 1B in the frequency block FB3, and in the transmission state belonging to the group b in FIG. 1B in the frequency block FB4. In the frequency block FB3, uplink data and a control signal from the mobile station UE3 are demodulated by using a pilot signal in the same frequency block, and the same pilot signal is also used to measure CQI. In the frequency block FB4, uplink data from the mobile station UE3 is modulated by using a pilot signal in the same frequency block, and the same pilot signal is also used to measure CQI.

On the other hand, the mobile station UE11, underlined in FIG. 2B, has transmitted neither control signal nor data in the frequency blocks FB3 and FB4 in the frame FR1. Accordingly, the mobile station UE11 has transmitted no demodulation pilot signal. That is, the mobile station UE11 is in the transmission state belonging to the group d in FIG. 1B. To the mobile station UE11 in such a state, the base station according to the present embodiment allocates the CQI-specific pilot resource in accordance with the undermentioned allocation control, thereby measuring CQI of the mobile station UE11 in the frequency blocks FB3 and FB4.

The allocation of the resources is similarly performed in the subsequent frame FR2. For example, in the frequency block FB1, the control resource is allocated to the mobile stations UE1 and UE6, the pilot resource is allocated to the mobile stations UE1, UE6, and UE10, and the data resource is allocated to the mobile station UE1. For example, uplink data and a control signal from the mobile station UE1 is demodulated by using a pilot signal, and the same pilot signal is also used to measure CQI. To the mobile station UE10 underlined in FIG. 2B, the base station according to the present embodiment allocates the CQI-specific pilot resource in accordance with the undermentioned allocation control, thereby measuring CQI of the mobile station UE10.

As described above, in each frame, the CQI-specific pilot resource is allocated to a mobile station in the transmission state belonging to the group d in FIG. 1B as long as there is a surplus of the resource, which will be described later.

1.3) Resource Allocation Control Between Frames

In FIG. 2B, referring to the mobile station UE12 for example, in the first frame FR1, the CQI-specific pilot resource is allocated in the frequency block FB1 as described above. However, in the subsequent frame FR2, the CQI-specific pilot resource is allocated to the mobile station UE12 in the frequency block FB2, whereby CQI is measured. Similarly, referring to the mobile station UE9, in the frame FR1, the CQI-specific pilot resource is allocated in the frequency block FB2 as described above. However, in the subsequent frame FR2, the CQI-specific pilot resource is allocated to the mobile station UE9 in the frequency blocks FB3 and FB4, whereby CQI is measured. Note that since CQI of a mobile station does not need to be measured in every frame, the CQI-specific pilot resource can be allocated in every plurality of frames, depending on the circumstances.

In this manner, the CQI-specific pilot resource is allocated to mobile stations in the transmission state belonging to the group d in FIG. 1B sequentially in one frame after another. Thus, CQI of a mobile station can be measured at predetermined periods. If there are a plurality of mobile stations in the transmission state belonging to the group d in FIG. 1B, equitable allocation can be accomplished by adopting, for example, an allocation method by which a higher priority is placed on a mobile station waiting for a longer time.

Additionally, in the frame FR1, the mobile station UE2 transmits a control signal and data signal in the frequency block FB2 (in the transmission state belonging to the group a in FIG. 1B) and transmits a demodulation pilot signal having the same bandwidth. However, in the subsequent frame FR2, the mobile station UE2 falls in a data transmission wait state (in the transmission state belonging to the group c) in which the mobile station UE2 transmits a control signal in the frequency block FB3 and transmits a modulation pilot signal having the same bandwidth. Demodulation pilot signals changing the frequency blocks to be transmitted in every frame as described above, are utilized to measure CQI.

Figure 2A:
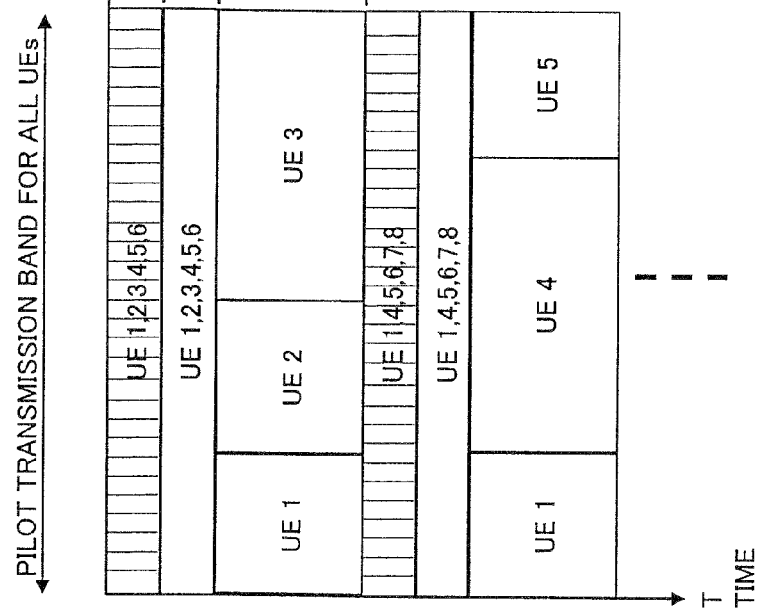
FIG. 2A is a diagram schematically showing the allocation of a resource for CQI measurement according to a hitherto-used technique.

Similarly thereafter, the CQI-specific pilot resource is sequentially allocated to a mobile station in a frequency block where this mobile station is not transmitting a demodulation pilot signal, whereby CQI of each mobile station is measured at predetermined CQI measurement periods. In a frequency block where a demodulation pilot signal is being transmitted, CQI is measured by utilizing this demodulation pilot signal. As described above, according to the present embodiment, a bandwidth with which a mobile station transmits a pilot signal is variable depending on the transmission states of the mobile stations as shown in FIG. 2B, in contrast to hitherto-used techniques (see FIG. 2A) by which the band for pilot transmission is invariant, used by all the mobile stations.

1.4) CQI Measurement Period

As a CQI measurement period becomes shorter, although accurate scheduling can be made for mobile stations moving faster, the overhead becomes larger. Conversely, if a CQI measurement period is made long, the overhead can be reduced but accurate scheduling cannot be performed for mobile stations moving fast. Therefore, it is preferable that the CQI measurement period be determined with consideration given to what moving speed of a mobile station the optimization is based on.

For example, assuming that a coherent time is a time during which conceivable channel quality changes can be regarded as constant, the advantages of the channel-dependent scheduling cannot be obtained when the CQI measurement period is longer than the coherent time. Accordingly, it is preferable that the CQI measurement period be set so as to be not longer than the conceivable coherent time.

Incidentally, the coherent time is dependent on the moving speed of a mobile station and is defined by $\frac{1}{2}f_D$ where $f_D$ is the maximum Doppler frequency and is defined as "$f_D=v/\lambda$" (where v is the moving speed, and $\lambda$ is the wavelength of a carrier wave). For example, assuming that the frequency of a carrier wave is 2 GHz, when the moving speed v is 3 km/h, $f_D$ is 5.5 Hz, and accordingly the coherent time is 90 ms. When the moving speed v is 120 km/h, $f_D$ is 222 Hz, and accordingly the coherent time is 2.25 ms. For example, the CQI measurement period is preset with consideration given to the moving speed of a mobile station to which the channel-dependent scheduling is intended to be applied. Alternatively, the CQI measurement period can be selected appropriately in accordance with the moving speed of each mobile station.

1.5) Advantages

As described above, when a demodulation pilot signal is utilized also to measure CQI, it is possible to perform control such that no CQI-specific pilot signal is transmitted. Therefore, there is no need to prepare the CQI-specific pilot resource for every mobile station. Specifically, when a demodulation pilot signal is transmitted, this demodulation pilot signal is also used to measure CQI. In a range of a scheduling band where no demodulation pilot signal is transmitted, the CQI-specific pilot resource is prepared, whereby CQI is measured. Thus, it is possible to achieve efficient channel quality measurement, with the small overhead across the whole bandwidth composed of a plurality of frequency blocks.

Moreover, the CQI-specific pilot resource is allocated only in a range of a scheduling band where neither data resource nor control resource is allocated within a CQI measurement period. Thereby, even in the case where a pilot signal is used both for demodulation and CQI measurement, the number of mobile stations for which CQI measurement is performed can be increased, and the overhead can be reduced.

Further, it is possible to suppress a peak-to-average power ratio (PAPR), when single carrier transmission is performed by allocating the pilot resource to a mobile station in contiguous frequency blocks.

Additionally, in the present embodiment, specific schemes to perform channel-dependent scheduling are of no significance. For example, similar advantages can be obtained by using, for example, a maximum CIR method or another channel-dependent scheduling method as well.

1.6) Base Station

FIG. 3 is a block diagram showing a configuration of a base station in a mobile communications system according to the first exemplary embodiment of the present invention. Here, it is assumed that a base station 100 accommodates N mobile stations (UEs) 1 to N. The base station is also called "NodeB".

A radio communication section 101 of the base station 100 receives an uplink control signal and/or uplink data from each mobile station, demodulates it (or them) in accordance with a pilot signal similarly received from the mobile station, and outputs the control signal to a control signal extraction section 102 and the pilot signal to a CQI measurement section 105.

The control signal extraction section 102 extracts resource allocation information, such as a request for resource allocation here, and outputs it to a scheduler 103. The scheduler 103 includes a resource management section 104, which will be described later. The resource management section 104 manages past resource allocation information in each frequency block for each mobile station and, when new resource allocation information is inputted from the control signal extraction section 102, always updates the corresponding resource information.

In response to a request to measure CQI of a mobile station designated by the scheduler 103, the CQI measurement section 105 performs CQI measurement by using a pilot signal obtained from the radio communication section 101 and returns a measured CQI value to the scheduler 103. The scheduler 103 allocates a resource to this mobile station, based on the measured CQI value and the information from the resource management section 104, and outputs information about this resource allocation to a control signal generation section 106. The control signal generation section 106 generates a control signal containing the information about the resource allocation to this mobile station and transmits the control signal to the mobile station in question through the radio communication section 101.

Incidentally, the base station 100 is provided with a control section 107 which controls the entire operation of the base station 100. The channel-dependent/-independent scheduling by the scheduler 103 and the resource management by the resource management section 104 are performed under the control of the control section 107. For example, in accordance with resource allocation control as shown in FIG. 2B, the radio communication section 101 transmits and receives a control signal, pilot signal, and data to/from each of the mobile stations 1 to N. Generally, the control section 107 performs various kinds of control, such as pilot resource allocation control, by executing control programs on a program-controlled processor or a computer. The scheduler 103 and resource management section 104 can also be implemented by executing respective scheduling and resource management programs on a single program-controlled processor or separate program-controlled processors.

1.7) Resource Management Table

FIG. 4 is a schematic diagram showing a structure of resource blocks adopted in the present embodiment. The resource blocks to be allocated to mobile stations are composed of block units obtained by dividing M frequency blocks 1 to M in the frequency direction each into the control resource, pilot resource and data resource in the time direction. Note that it is also possible that, with a minimum frequency block unit defined, one resource block is composed of a plurality of the minimum frequency block units.

In the control resource and pilot resource in each of the frequency blocks 1 to M, there is a predetermined upper limit to the number of mobile stations that can be multiplexed because the number of orthogonal pilot channels is limited. When the number of multiplexed mobile stations is smaller than this upper limit, it is possible to allocate a resource to transmit the above-described CQI-specific pilot signal.

FIG. 5 is a schematic diagram showing an example of information stored in a resource management table used by the resource management section 104. In the resource management table, the scheduling band, the presence or absence of the pilot resource within a CQI measurement range, and the like are managed for each mobile station. Here, when the pilot resource is absent in a scheduling band, the CQI-specific pilot resource is allocated.

For example, in the case where the frequency blocks 1 to 3 are the scheduling band for the mobile station 1, the pilot resource is allocated in the frequency blocks 1 and 2, (because a control signal or data is being transmitted, for example) but is not allocated in the frequency block 3 in this example. Accordingly, in the case of performing channel-dependent scheduling, the base station needs to measure CQI in the frequency block 3. Therefore, the CQI-specific pilot resource is allocated to the mobile station 1 in the frequency block 3.

Hereinafter, more detailed description will be given of the operation control in which while updating such a resource management table, the base station allocates a resource to transmit a CQI-specific pilot signal to a mobile station and thereby performs CQI measurement, with reference to a flow chart.

1.8) Resource Allocation Control

Figure 6:
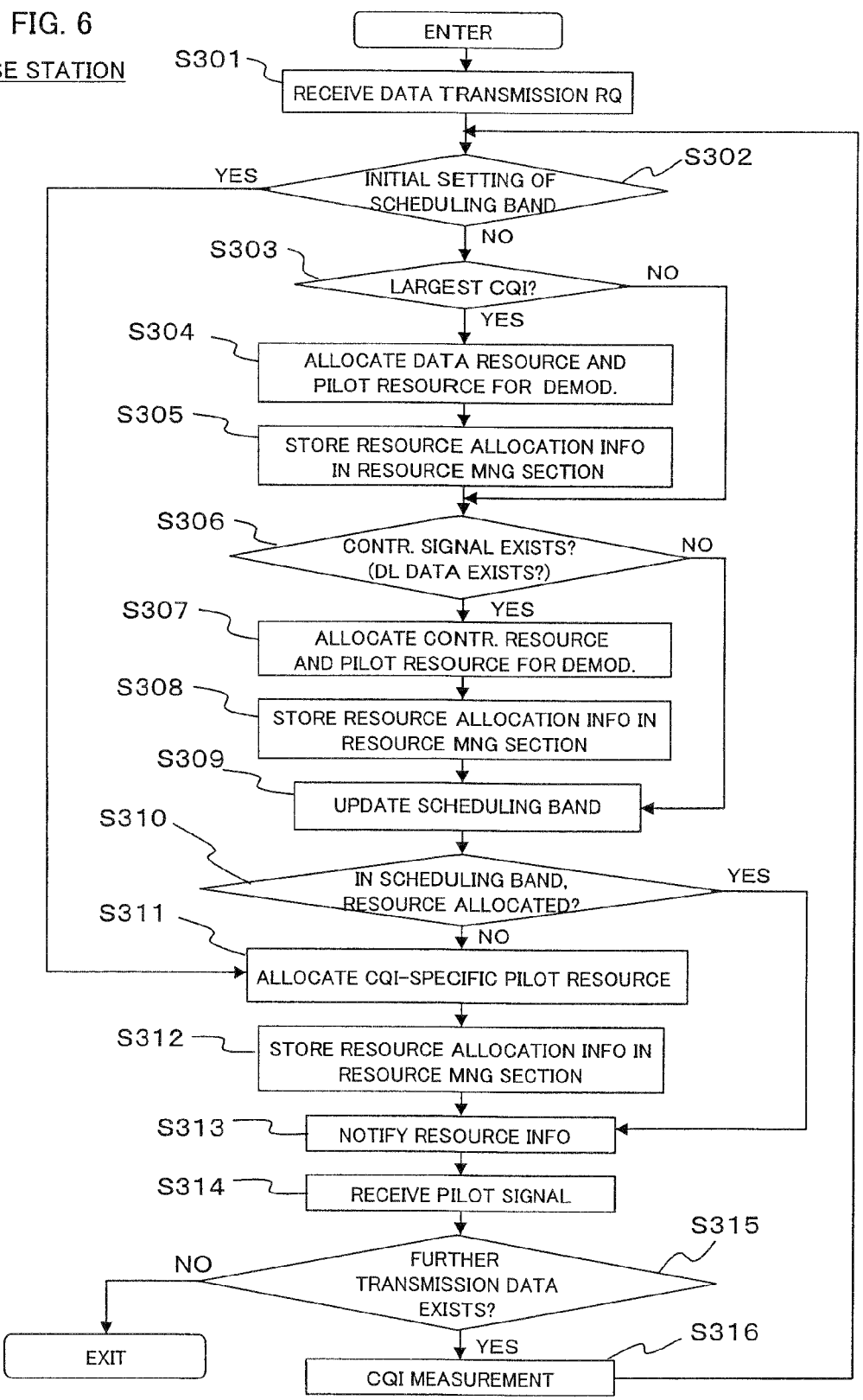
FIG. 6 is a flow chart showing a resource allocation control method performed by the base station according to the first exemplary embodiment of the present invention.

FIG. 6 is a flow chart showing a resource allocation control method performed by the base station according to the first exemplary embodiment of the present invention. Here, the resource allocation control in a scheduling band for an arbitrary mobile station will be described.

First, when a data transmission request from a mobile station occurs, that is, when a data transmission request is inputted to the scheduler 103 from the control signal extraction section 102 (step S301), the scheduler 103 determines whether or not a currently valid measured CQI value exists with respect to the mobile station in question (step S302). When such a valid measured CQI value does not exist, the control moves to a step S311 to make an initial setting of a scheduling band for the mobile station (step S302:YES). This initial setting is an operation to obtain a measured CQI value that is currently valid, by allocating the CQI-specific pilot resource.

When the valid measured CQI value exists with respect to the mobile station (step S302: NO), the scheduler 103 compares the measured CQI values of all the mobile stations and, based on the result of this comparison, determines a frequency block to allocate to this mobile station (step S303). Conceivable methods for this determination include: a method of determining a frequency block in which the measured CQI value of this mobile station is the largest in the scheduling band; a method of determining a frequency block in which the measured CQI value of this mobile station is the largest among the mobile stations in this frequency block; a method of selecting any frequency block in which the measured CQI value of this mobile station is not smaller than a reference CQI value; and combinations of these methods. In FIG. 6, the method of determining a frequency block in which the measurement CQI value of this mobile station is the largest in the scheduling band is shown as an example.

When the measured CQI value of the mobile station is the largest in a specific frequency block (S303: YES), the scheduler 103 allocates to this mobile station the data resource and demodulation pilot resource having the same bandwidth as this data resource (step S304), and the resource management section 104 registers information about this resource allocation in the resource management table (step S305). This information about the resource allocation is used to update the scheduling band and to determine whether or not to allocate the CQI-specific pilot resource. When it is determined that the measured CQI value of this mobile station is not the largest (step S303: NO), the control moves to a step S306.

Subsequently, the scheduler 103 determines whether or not a control signal from the mobile station exists, here whether or not downlink data exists (step S306). When such a control signal exists (step S306:YES), the scheduler 103 allocates to this mobile station the control resource and demodulation pilot resource having the same bandwidth as this control resource while changing a frequency block in every predetermined number of frames (step S307). The resource management section 104 registers information about this resource allocation in the resource management table (step S308). When the registration in the resource management table is finished, or when no control signal from the mobile station exists (step S306: NO), the scheduler 103 updates the scheduling band (step S309).

There can be considered several update methods for the scheduling band, for example: 1) a method of maintaining the initially set scheduling band as it is; 2) a method of updating, only once, to frequency block(s) in which data resource and/or control resource have been allocated during the first CQI measurement period after the initial setting of the scheduling band; 3) a method of updating, one after another, to frequency block(s) in which data resource and/or control resource have been allocated during each CQI measurement period; 4) a method of updating, only once, to frequency block(s) in which data resource has been allocated during the first CQI measurement period after the initial setting of the scheduling band; and 5) a method of updating, one after another, to frequency block(s) in which the data resource has been allocated during each CQI measurement period.

Subsequently, it is determined whether or not the processing of data resource allocation or control resource allocation (step S304 or S307) has been performed in the scheduling band during a CQI measurement period (step S310). When neither data resource nor control resource is allocated (step S310: NO), that is, when the mobile station is in the transmission state belonging to the group d in FIG. 1B, then the scheduler 103 allocates the CQI-specific pilot resource to this mobile station (step S311), and the resource management section 104 registers information about this resource allocation in the resource management table (step S312). Note that when there are a plurality of mobile stations in the transmission state belonging to the group d in FIG. 1B, it suffices that a mobile station is selected, with a certain criterion predetermined. For example, allocation can be performed so that a priory is placed in descending order of the amount of waiting time.

When the data resource or control resource is allocated to the mobile station in the scheduling band (step S310: YES), the control moves to a step S313.

Subsequently, the scheduler 103 outputs the corresponding resource information in the resource management table to the control signal generation section 106, which notifies the mobile station of this resource information by using a downlink control signal (step S313). When a pilot signal is received from this mobile station (step S314), it is determined whether or not there will be transmission data from this mobile station (step S315). When there will be transmission data, the scheduler 103 requests the CQI measurement section 105 to measure CQI of the mobile station by using the pilot signal from this mobile station (step S316). When the scheduler 103 received the result of this measurement, the control returns to the step S302. When there will be no transmission data from the mobile station, the process is terminated without performing CQI measurement.

As described above, if the data resource or control resource is allocated in the scheduling band during a CQI measurement period, the demodulation pilot signal for the data or control signal is utilized to measure CQI, without a CQI-specific pilot signal being transmitted. On the other hand, when neither data resource nor control resource is allocated, since a demodulation pilot signal is not transmitted, the scheduler 103 allocates the CQI-specific pilot resource to the mobile station, thereby measuring CQI. Thus, it is possible to perform efficient channel quality measurement, with the small overhead across the entire scheduling band.

1.9) Mobile Station

Figure 7:
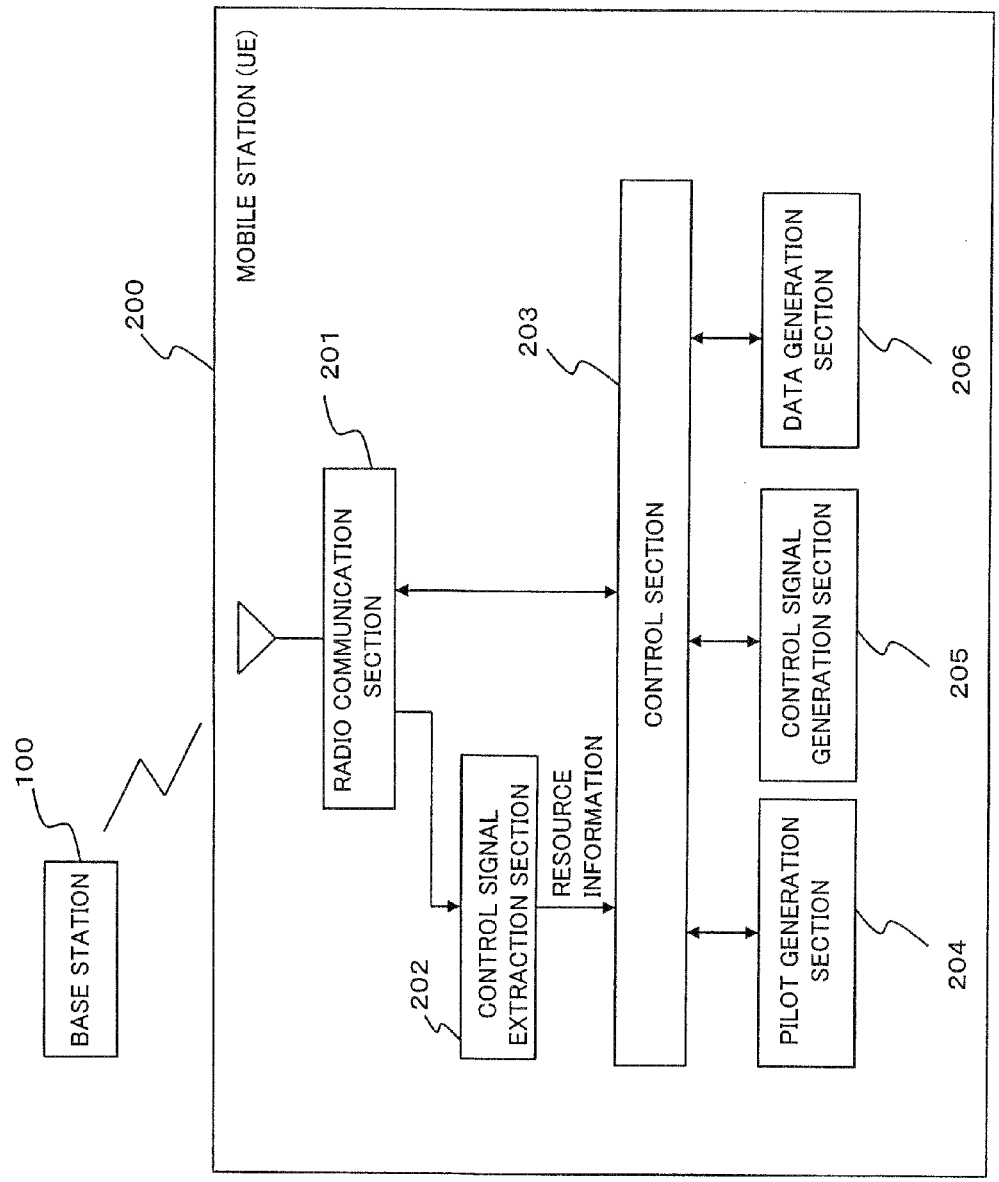
FIG. 7 is a block diagram showing a configuration of a mobile station in the mobile communications system according to the first exemplary embodiment of the present invention.

FIG. 7 is a block diagram showing a configuration of a mobile station in the mobile communications system according to the first exemplary embodiment of the present invention. A mobile station 200 includes a radio communication section 201 that is capable of transmitting and receiving radio signals to/from the base station 100. The radio communication section 201 outputs a control signal received from the base station 100 to a control signal extraction section 202, which extracts control information about resource allocation and outputs it to a control section 203.

The control section 203 controls the radio communication section 201, a pilot generation section 204, a control signal generation section 205, and a data generation section 206 and performs the undermentioned transmission/reception operation. The pilot generation section 204 generates a CQI-specific pilot signal in accordance with information about the allocation of the CQI-specific pilot resource, received from the base station. The control signal generation section 205 generates a data transmission request, as well as other control signals according to information about the allocation of the control resource, received from the base station. The data generation section 206 generates uplink data to transmit using the data resource allocated by the base station.

Incidentally, the transmission/reception operation of the mobile station 200 is controlled by the control section 203. As shown in FIG. 2B for example, the transmission and reception of a control signal, pilot signal and data are performed in accordance with information about resource allocation received from the base station 100. In general, the control section 203 performs various kinds of control, such as pilot generation and control signal generation, by executing programs on a program-controlled processor or computer. The pilot generation section 204, control signal generation section 205, and data generation section 206 can also be implemented by executing their corresponding programs on a single program-controlled processor or separate program-controlled processors.

FIG. 8 is a flow chart showing the operation of the mobile station shown in FIG. 7. First, when there is uplink data to transmit to the base station 100, the control section 203 instructs the control signal generation section 205 to generate a control signal of a data transmission request and transmits it to the base station 100 through the radio communication section 201.

When receiving information about resource allocation from the base station 100 in response to this data transmission request (step S401), the control section 203 refers to the received information about resource allocation and determines whether or not the pilot resource is allocated (step S402). If the pilot resource is not allocated (step S402: NO), the process is terminated. If the pilot resource is allocated (step S402: YES), the control section 203 instructs the pilot generation section 204 to generate a pilot signal (step S403).

Subsequently, the control section 203 refers to the same received information about resource allocation and determines whether or not the data resource is allocated (step S404). If the data resource is not allocated (step S404: NO), the control moves to a step S406, which will be described below. If the data resource is allocated (step S404: YES), the control section 203 instructs the data generation section 206 to generate a data signal (step S405).

Subsequently, the control section 203 refers to the same received information about resource allocation and determines whether or not the control resource is allocated (step S406). If the control resource is not allocated (step S406: NO), the control section 203 transmits the signal (or signals) generated in the step S403 and/or step S405 to the base station 100 through the radio communication section 201 (step S408). If the control resource is allocated (step S406: YES), the control section 203 instructs the control signal generation section 205 to generate a control signal (step S407) and transmits it, along with the signal (or signals) generated in the step S403 and/or step S405, to the base station 100 through the radio communication section 201 (step S408).

As mentioned already, in the case where the allocation of the pilot resource only is notified from the base station 100, neither control resource nor data resource is allocated. Accordingly, after the control goes through the steps S403, S404 (NO), and S406 (NO), the pilot signal is transmitted to the base station 100 for the dedicated purpose of CQI measurement, according to the control shown in FIG. 8.

1.10 First Example

Figure 9A:
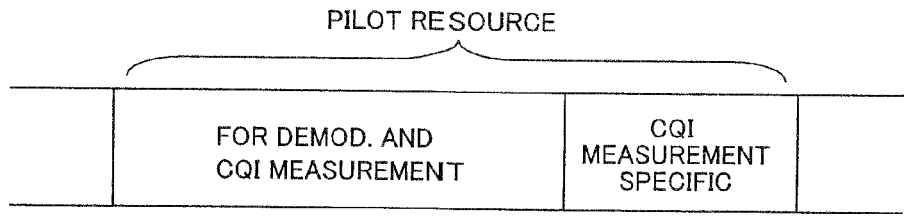
FIG. 9A is a schematic diagram showing an allocation of a pilot resource according a first example of the present invention.
Figure 9B:
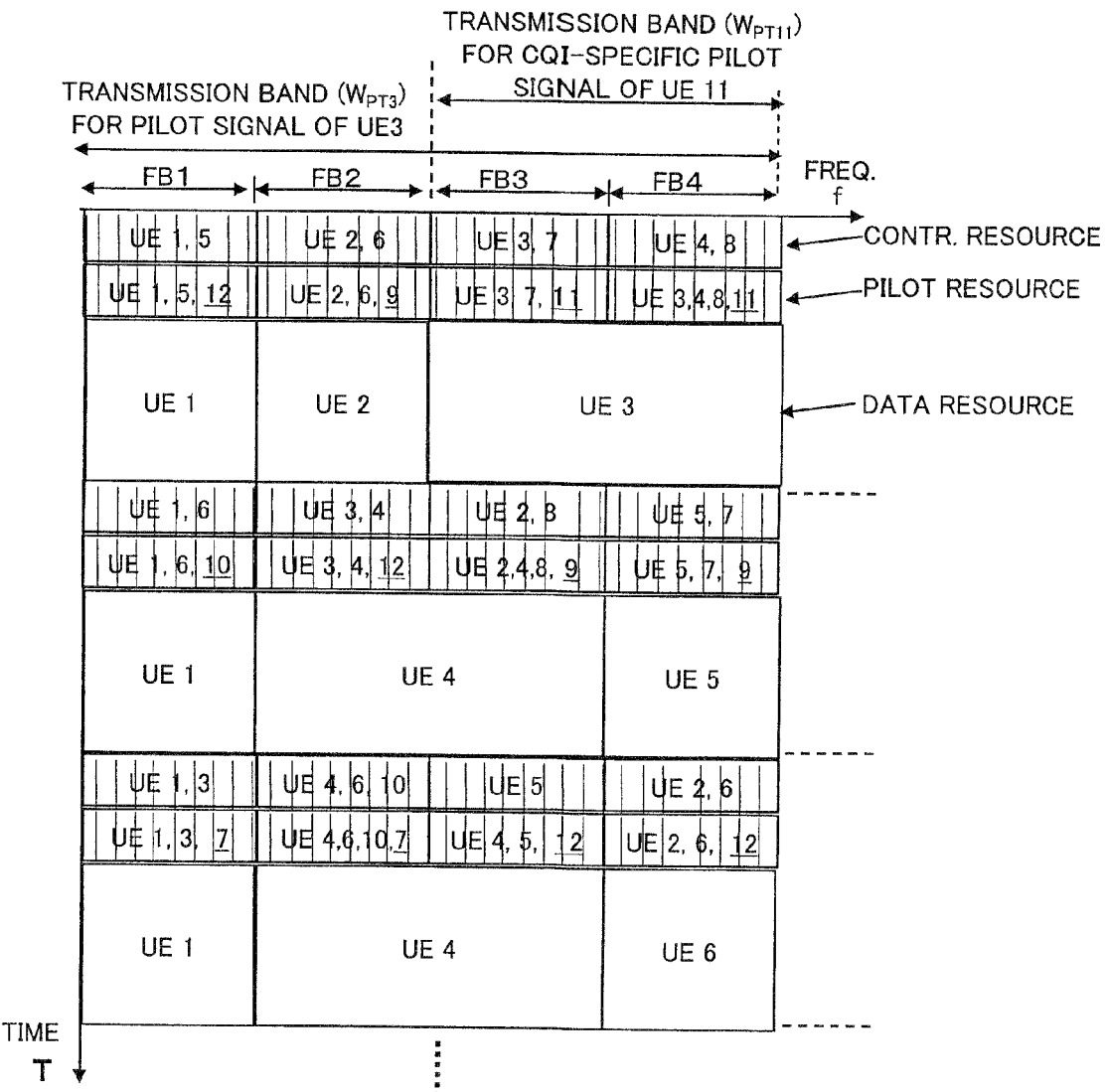
FIG. 9B is a schematic diagram showing an example of the resource allocation according to the first example.

FIG. 9A is a schematic diagram showing an allocation of the pilot resource according a first example of the present invention. FIG. 9B is a schematic diagram showing an example of the resource allocation according to the first example. Although four frequency bands (frequency blocks FB1 to FB4) are shown in FIG. 9B to simplify the description here as well, the number of frequency blocks is not limited to four as in this example, and the entire band may include any other number of multiple frequency blocks. Moreover, each frequency block FB may be a sub-carrier frequency block including a plurality of sub carriers. As for the multiplexing method, distributed FDM can be used in the control resource, and code division multiplexing (CDM) or distributed FDM can be used in the pilot resource.

Referring to FIG. 9A, in the present example, a predetermined fraction of the pilot resource is secured exclusively for CQI measurement. In the present example, a quarter of the pilot resource is secured for the CQI-specific pilot resource.

In the example shown in FIG. 9B, the CQI-specific pilot resource is allocated to a mobile station underlined, in each frequency block. Each mobile station transmits a demodulation pilot signal with the same bandwidth as that of the band in which the mobile station is transmitting a data signal and/or a control signal. In the case of a mobile station that is transmitting only a control signal in particular, since the amount of transmission data is small, the mobile station transmits in a bandwidth narrower than the bandwidth where CQI is measured. Further, in the case of a mobile station that desires CQI measurement outside the band where a data signal or control signal is being transmitted, the base station allocates the CQI-specific pilot resource to this mobile station in a CQI measurement period.

According to the present example, the bandwidth with which each mobile station transmits a pilot signal is variable depending on the transmission state of each mobile station as shown in FIG. 9B, in contrast to hitherto-used techniques (see FIG. 2A) by which the bandwidth for pilot transmission is invariant, used by all the mobile stations.

Incidentally, the overheads of control signals can be reduced in such a manner that when the allocation of the resource for a CQI-specific pilot signal is started, only the pattern of the allocated resource (e.g., frequency to be used and transmission period) is notified to a mobile station with a downlink control signal, and when the allocation of the resource is terminated, this fact is notified to the mobile station with a downlink control signal.

1.11 Second Example

Figure 10A:
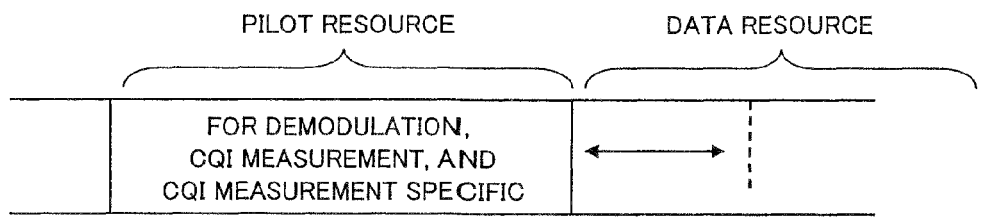
FIG. 10A is a schematic diagram showing an allocation of a pilot resource according a second example of the present invention.
Figure 10B:
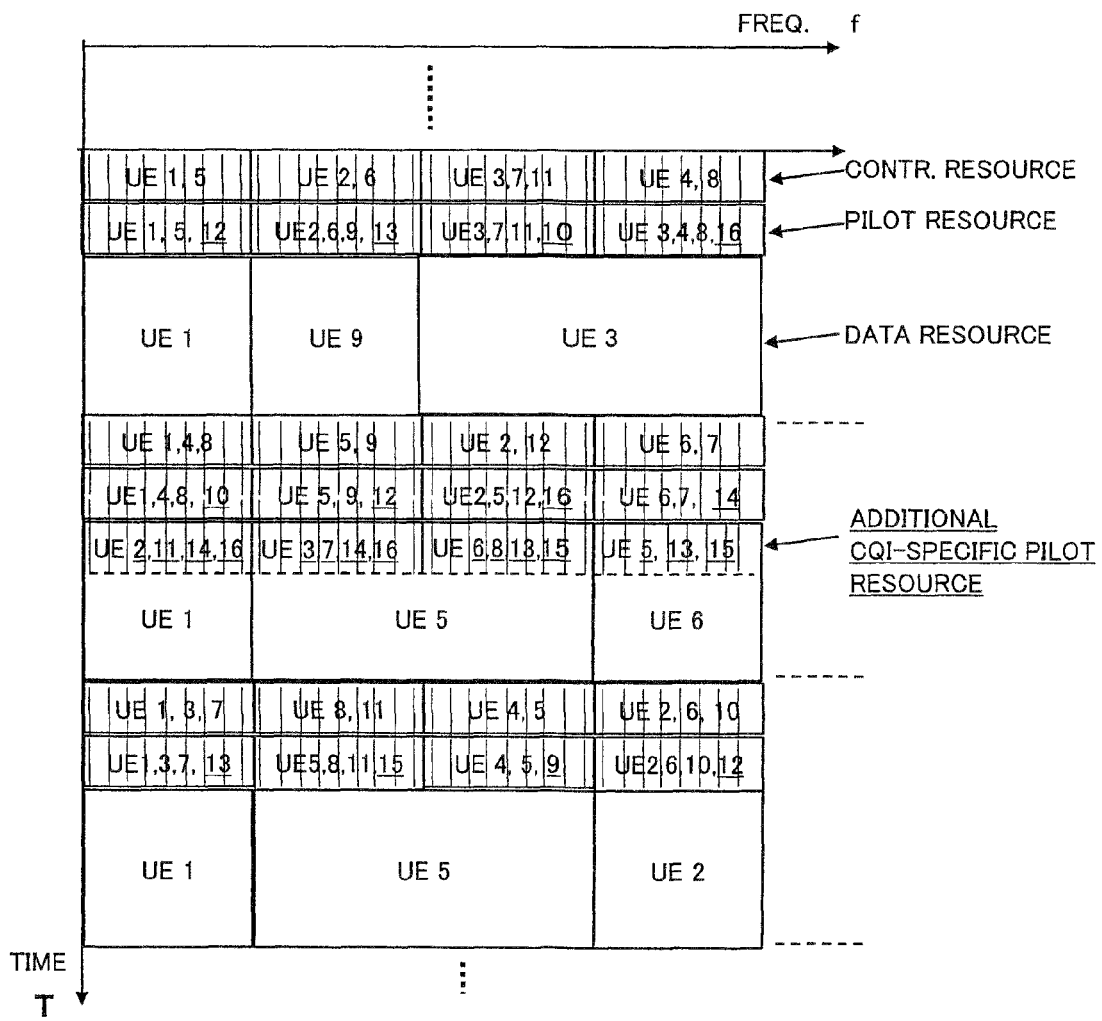
FIG. 10B is a schematic diagram showing an example of the resource allocation according to the second example.

FIG. 10A is a schematic diagram showing an allocation of the pilot resource according a second example of the present invention. FIG. 10B is a schematic diagram showing an example of the resource allocation according to the second example.

Referring to FIG. 10A, according to the present example, in the case where an available resource in the pilot resource is insufficient for the number of mobile stations to which the pilot resource for CQI measurement is to be applied, the amount of the pilot resource can be appropriately controlled by using part of the data resource for the pilot resource. Therefore, resource allocation depending on the circumstances is possible, according to the present example. However, since information about an allocated resource needs to be transmitted using a downlink control signal each time the resource in question is allocated, the overhead of the downlink control signal increases in comparison with the case where the predetermined resources are allocated. Incidentally, the downlink control signal here is transmitted through, for example, a shared control channel (SCCH), broadcast channel (BCH), or the like.

In the first frame shown in FIG. 10B, the CQI-specific pilot resource is allocated (to mobile stations UE with underlined numerals) as described above in the first example. However, in the next frame, since an available resource in the pilot resource is insufficient, the CQI-specific pilot resource is additionally allocated by utilizing part of the data resource. Since the CQI-specific pilot resource can be flexibly allocated in this manner, it is possible to perform efficient channel-dependent scheduling.

Note that the second example is applicable even in the case where a fixed amount of the CQI-specific pilot resource is secured as in the first example.

2. Second Exemplary Embodiment

FIG. 11 is a block diagram showing configurations of a base station and mobile station in a mobile communications system according to a second exemplary embodiment of the present invention. However, since the configuration of a base station 100 is substantially the same as that of the base station according to the first exemplary embodiment shown in FIG. 3, the same reference numerals as in the first exemplary embodiment will be used, and the detailed description thereof will be omitted. Moreover, the configuration of a mobile station 200 also is basically the same as that of the mobile station according to the first exemplary embodiment shown in FIG. 7, except that a transmission mode selection section 207 is provided in the second exemplary embodiment. Therefore, the same reference numerals as in the first exemplary embodiment are given to the blocks having the same functions as the counterparts in the first exemplary embodiment shown in FIG. 7, and the detailed description thereof will be omitted.

In the above-described first exemplary embodiment, the method is used in which the CQI-specific pilot resource is allocated in the scheduling band where neither data signal nor control signal is transmitted in a CQI measurement period. However, according to the second exemplary embodiment, when the allocation of the CQI-specific pilot resource is not performed over a CQI measurement period or more, the base station notifies the mobile station that no resource is allocated. Upon receipt of this notification, the mobile station selects a transmission mode of its own and notifies the selected transmission mode to the base station. Hereinafter, this will be described in more detail.

2.1) Operation of Base Station

Figure 12:
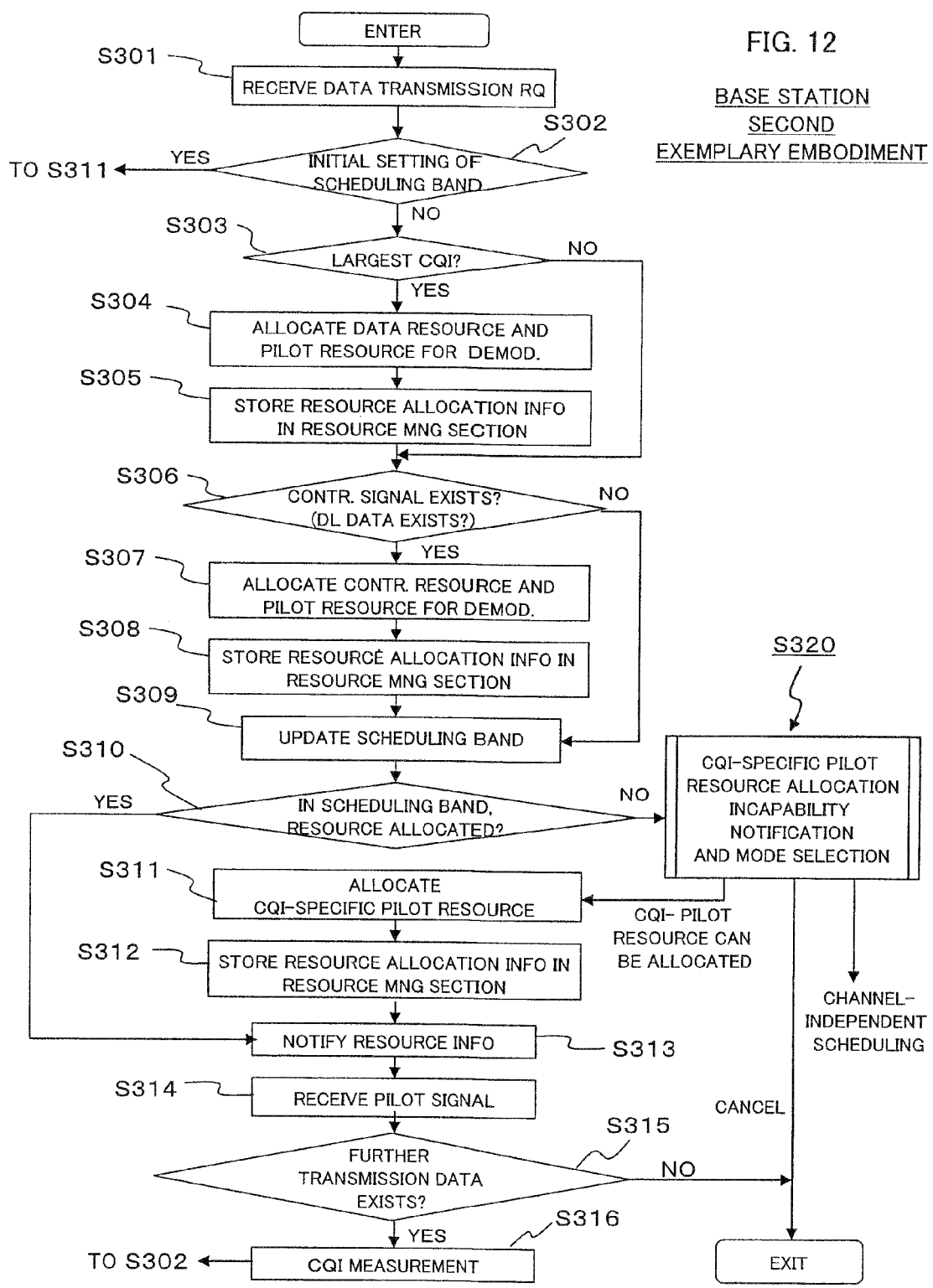
FIG. 12 is a flow chart showing the operation of the base station in the mobile communications system according to the second exemplary embodiment of the present invention.

FIG. 12 is a flow chart showing the operation of the base station in the mobile communications system according to the second exemplary embodiment of the present invention. However, since steps S301 to S316 are basically the same as in the first exemplary embodiment shown in FIG. 6, the same reference symbols and numerals as in the first exemplary embodiment are used, and the detailed description thereof will be omitted. The point different from the first exemplary embodiment shown in FIG. 6 is a step S320, and therefore description will be concentrated on this step.

First, in the step S310 in FIG. 12, it is determined whether or not the processing of allocating the data resource or control resource (step S304 or S307) has been performed in a scheduling band within a CQI measurement period. When neither data resource nor control resource is allocated (step S310: NO), notification of CQI-specific pilot resource allocation incapability, which is notification that the CQI-specific pilot resource cannot be allocated, and mode selection are carried out (step S320).

Through this process in the step S320, a transmission mode selected by the mobile station 200 is carried out. Here, three transmission modes (resource request cancellation, channel-independent scheduling, and CQI-specific pilot resource allocation wait) are shown as examples. When the mobile station 200 cancels the data transmission request, the base station 100 terminates the process straight away. When the mobile station 200 requests channel-independent scheduling, the scheduler 103 carries out channel-independent scheduling for the mobile station 200. Moreover, when the CQI-specific pilot resource becomes able to be allocated while the mobile station 200 is waiting, the allocation of the CQI-specific pilot resource is carried out as described already (step S311), and thereafter the processing in the above-described step S312 and subsequent steps is carried out.

2.1.1) First Example

Figure 13:
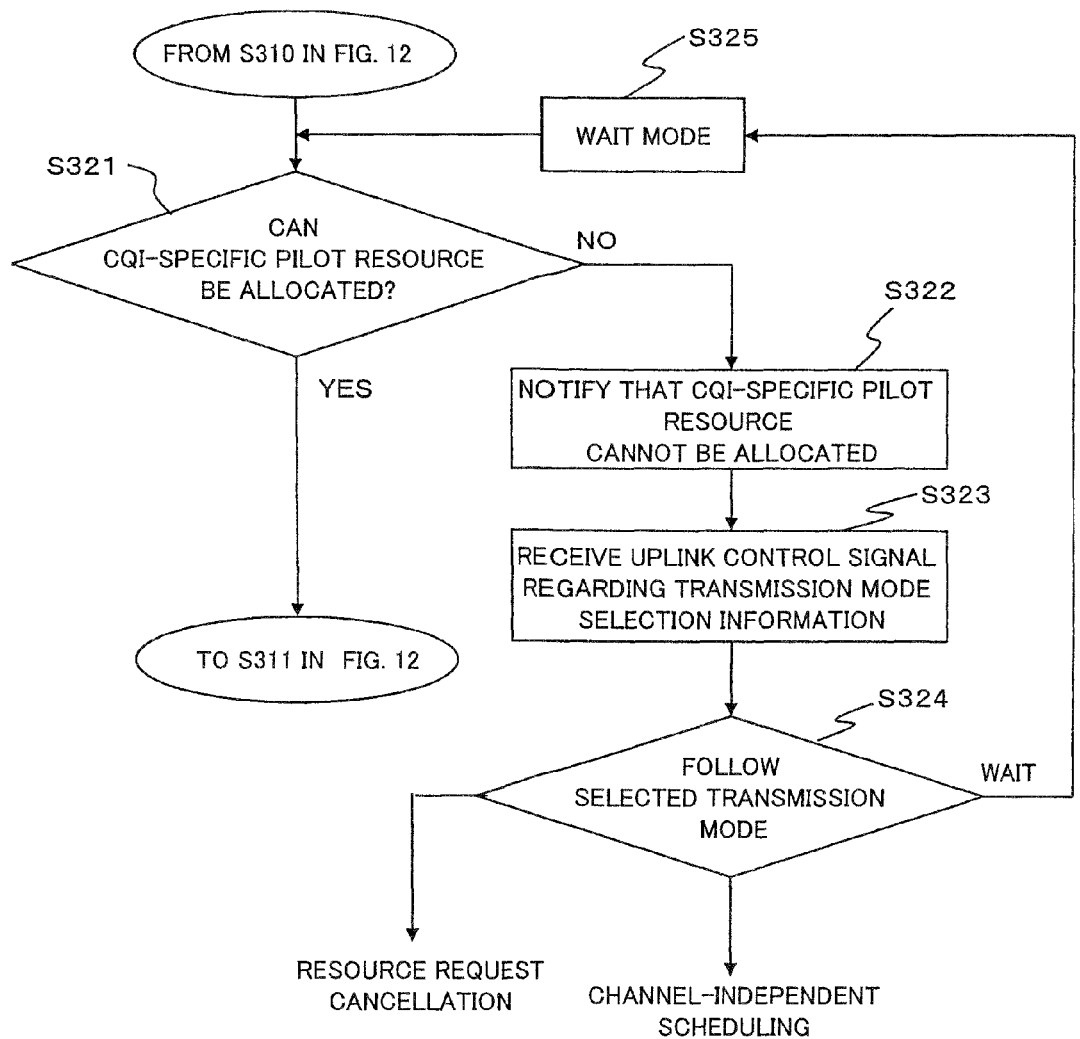
FIG. 13 is a flow chart showing a first example of the process at the step S320 in FIG. 12.

FIG. 13 is a flow chart showing a first example of the process in the step S320 in FIG. 12. First, the scheduler 103 determines whether or not the CQI-specific pilot resource can be allocated (step S321). If it can be allocated (step S321: YES), the control goes back to the step S311 in FIG. 12, where the allocation of the CQI-specific pilot resource is carried out (step S311). Thereafter, the processing in the above-described step S312 and subsequent steps is carried out.

If it is impossible to allocate the CQI-specific pilot resource because of the insufficient resource or the like (step S321: NO), the scheduler 103 controls the control signal generation section 106 to have it generate a downlink control signal indicating that the CQI-specific pilot resource is not allocated, transmits the downlink control signal to the mobile station 200 (step S322), and then waits for a response from the mobile station 200. The downlink control signal here is transmitted through, for example, SCCH or BCH.

When receiving an uplink control signal regarding a transmission mode from the mobile station 200 (step S323), the scheduler 103 carries out the processing according to the transmission mode selected by the mobile station 200 (step S324).

If the mobile station 200 selects the resource request cancellation, the scheduler 103 terminates the process shown in FIG. 12 straight away. If the mobile station 200 selects the channel-independent scheduling, the scheduler 103, for this mobile station 200, carries out channel-independent scheduling in which the resources are periodically allocated by, for example, round-robin or the like, irrespective of CQI.

Moreover, If the mobile station 200 selects the CQI-specific pilot resource allocation wait, the scheduler 103 falls in a standby mode with respect to this mobile station 200 (step S325). In the standby mode, for example, the scheduler 103 may wait to allocate the CQI-specific pilot resource until the scheduler 103 receives a resource request cancellation from the mobile station 200, or until a predetermined time set on a timer expires. Alternatively, after a predetermined time has passed, the scheduler 103 may return to the step S321 to determine whether or not the CQI-specific pilot resource can be allocated, and may repeat the steps S321 to S324 at predetermined time intervals until a predetermined time set on a timer expires.

2.1.2) Second Example

Figure 14:
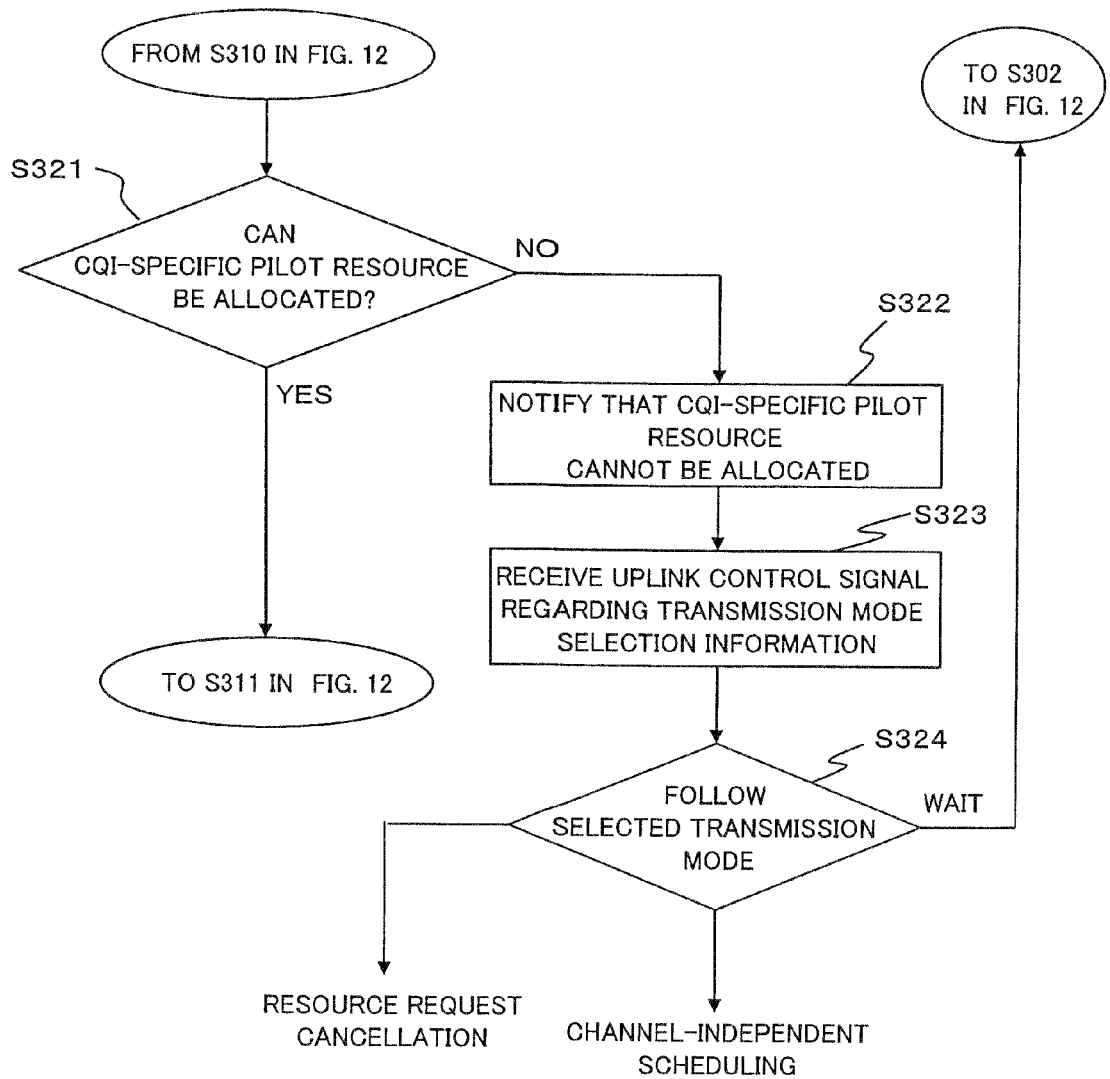
FIG. 14 is a flow chart showing a second example of the process at the step S320 in FIG. 12.

FIG. 14 is a flow chart showing a second example of the process in the step S320 in FIG. 12. Steps S321 to S324 in FIG. 14 are substantially the same as in the first example, and therefore the description thereof will be omitted.

In this second example, when the CQI-specific pilot resource allocation wait is selected in the step S324, the scheduler 103 does not fall in the standby mode but returns to the step S302 in FIG. 12 to determine whether or not a currently valid measured CQI value exists with respect to the mobile station 200. In this event, it is preferable that the repetition of the operation after the step S303 be limited by using a timer of the scheduler 103.

2.2) Operation of Mobile Station

Figure 15:
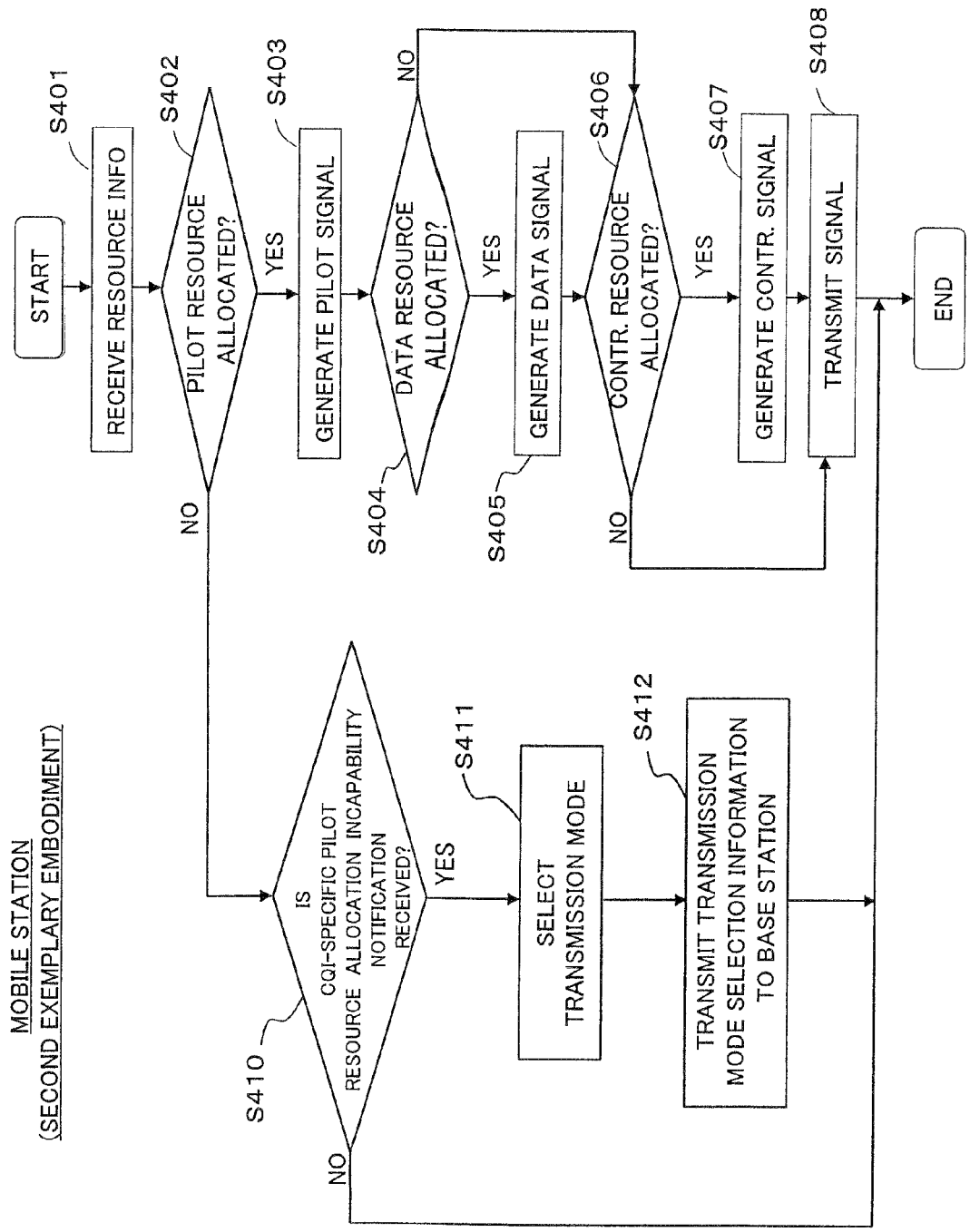
FIG. 15 is a flow chart showing the operation of the mobile station in the mobile communications system according to the second exemplary embodiment of the present invention.

FIG. 15 is a flow chart showing the operation of the mobile station in the mobile communications system according to the second exemplary embodiment of the present invention. However, steps S401 to S408 are substantially the same as in the first exemplary embodiment shown in FIG. 8, and therefore the description thereof will be omitted.

Referring to FIG. 15, the control section 203 refers to received information about resource allocation and determines whether or not the pilot resource is allocated (step S402). At this time, when the pilot resource is not allocated (step S402: NO), the control section 203 determines whether or not a CQI-specific pilot resource allocation incapability notification is received from the base station 100 (step S410). If such a notification is not received, the control section 203 terminates the process. If such a notification is received (step S410: YES), the control section 203 instructs the transmission mode selection section 207 to select a transmission mode (step S411). As described above, a transmission mode is selected from among a plurality of modes including the resource request cancellation, channel-independent scheduling, and CQI measurement pilot resource allocation wait.

When the transmission mode has been selected, the control section 203 instructs the control signal generation section 205 to generate an uplink control signal indicative of the selected transmission mode, and transmits the uplink control signal to the base station 100 through the radio communication section 201 (step S412). The uplink control signal here is transmitted through, for example, RACH, SCCH, or the like.

Incidentally, as described above, when the CQI-specific pilot resource allocation wait is selected, the control section 203 starts a timer. Then, when no pilot resource allocation is notified from the base station 100 even after a predetermined time has passed, the control section 203 may notifies the base station 100 of a cancellation of the resource request.

2.3) Advantages

According to the second exemplary embodiment of the present invention, in addition to the already-mentioned advantages of the first exemplary embodiment, the base station can notify the mobile station by using a downlink control signal that no resource is allocated, when the CQI-specific pilot resource cannot be allocated over a CQI measurement period or more, and the mobile station can transmit a transmission mode as a control signal to the base station. That is, the mobile station can take the initiative in selecting a transmission mode.

3. Third Exemplary Embodiment

FIG. 16 is a block diagram showing configurations of a base station and mobile station in a mobile communications system according to a third exemplary embodiment of the present invention. The configuration of a base station 100 is basically the same as that of the base station according to the first exemplary embodiment shown in FIG. 3 but is different in that a transmission mode selection section 107 is provided to the scheduler 103. Moreover, the configuration of a mobile station 200 is basically the same as that of the mobile station according to the first exemplary embodiment shown in FIG. 7. Therefore, the same reference numerals as in the first exemplary embodiment shown in FIGS. 3 and 7 are given to the blocks having the same functions as the counterparts of the base station and mobile station in the first exemplary embodiment, and the detailed description thereof will be omitted.

In the above-described second exemplary embodiment, the mobile station takes the initiative in selecting a transmission mode when the base station does not allocate the resource for a CQI-specific pilot signal. However, in the third exemplary embodiment, in such a case, the base station sends a control signal to the mobile station, and the mobile station follows the control signal. Conceivable transmission modes of which the base station instructs the mobile station include the resource request cancellation, channel-independent scheduling, and CQI-specific pilot resource allocation wait described in the second exemplary embodiment. However, the resource request cancellation is the simplest and also reduces the control loads. Therefore, an example in the case of selecting this resource request cancellation will be described hereinafter.

3.1) Operation of Base Station

Figure 17:
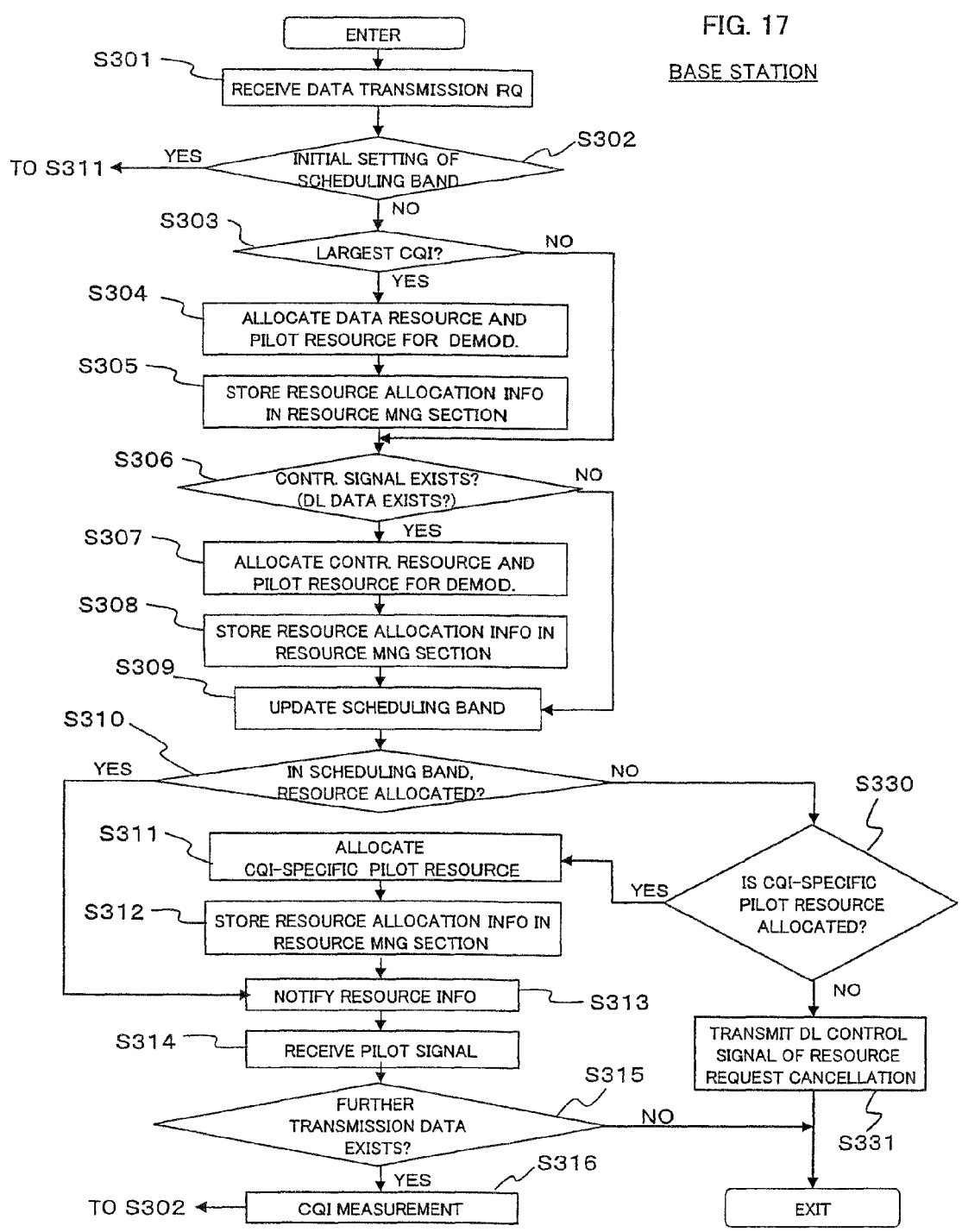
FIG. 17 is a flow chart showing the operation of the base station in the mobile communications system according to the third exemplary embodiment of the present invention.

FIG. 17 is a flow chart showing the operation of the base station in the mobile communications system according to the third exemplary embodiment of the present invention. However, since steps S301 to S316 are basically the same as in the second exemplary embodiment shown in FIG. 12, the same reference symbols and numerals as in the second exemplary embodiment are used, and the detailed description thereof will be omitted. In the third exemplary embodiment, steps S330 to S331 are different from the second exemplary embodiment shown in FIG. 12, and therefore description will be concentrated on these steps.

First, in the step S310 in FIG. 17, it is determined whether or not the processing of allocating the data resource or control resource (step S304 or S307) has been performed in a scheduling band within a CQI measurement period. When neither data resource nor control resource is allocated (step S310: NO), it is determined whether or not the CQI-specific pilot resource can be allocated (step S330). If it can be allocated (step S330: YES), the control goes back to the step S311 in FIG. 17, where the allocation of the CQI-specific pilot resource is carried out (step S311). Thereafter, the processing in the above-described step S312 and subsequent steps is carried out.

If it is impossible to allocate the CQI-specific pilot resource because of the insufficient resource or the like (step S330: NO), the scheduler 103 controls the control signal generation section 106 to have it generate a downlink control signal instructing to cancel the resource request, transmits the downlink control signal to the mobile station 200 (step S331), and then terminates the process. The downlink control signal here is transmitted through SCCH, BCH, or the like. The mobile station that has received this downlink control signal instructing to cancel the resource request operates as follows.

3.2) Operation of Mobile Station

Figure 18:
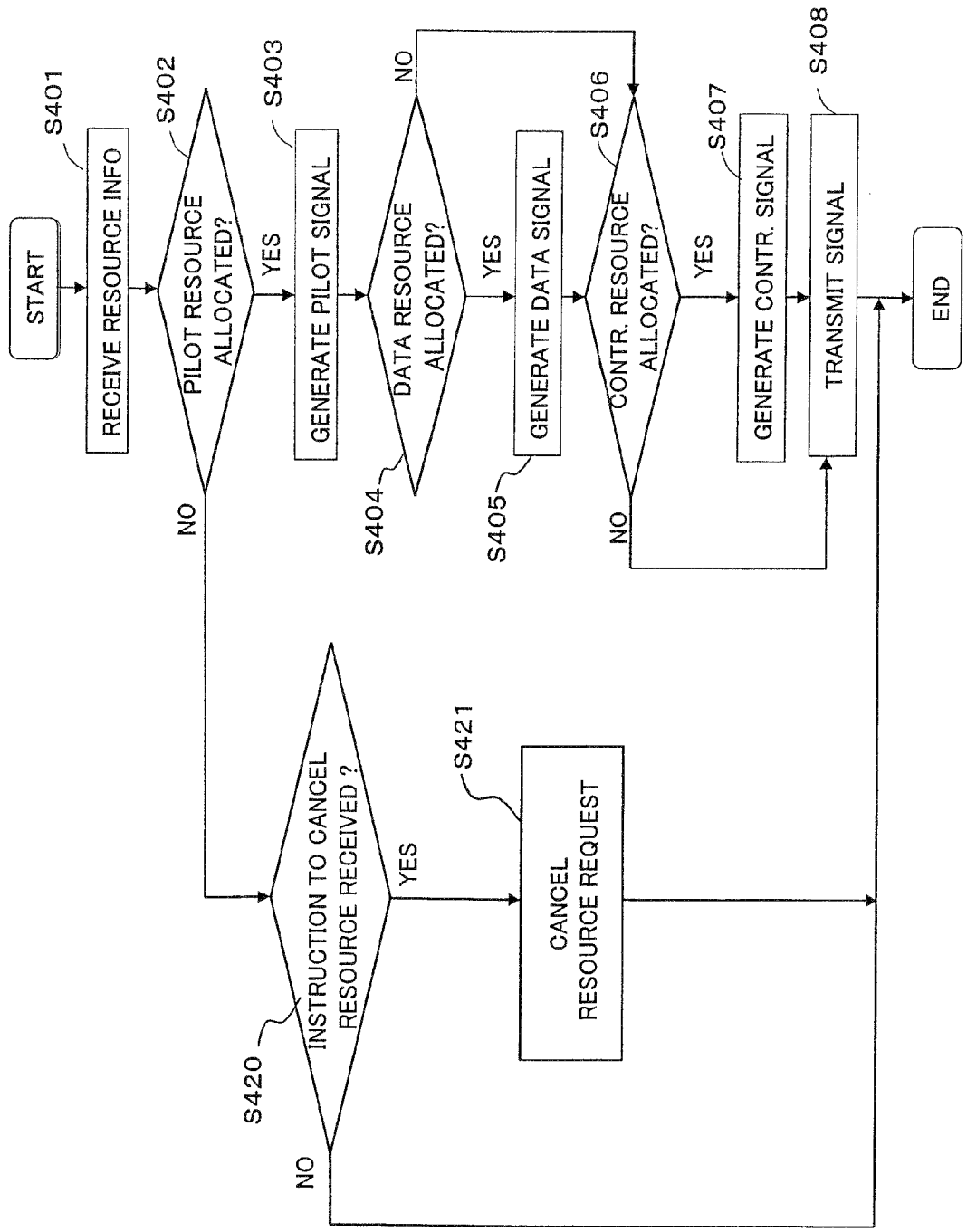
FIG. 18 is a flow chart showing the operation of the mobile station in the mobile communications system according to the third exemplary embodiment of the present invention.

FIG. 18 is a flow chart showing the operation of the mobile station in the mobile communications system according to the third exemplary embodiment of the present invention. However, steps S401 to S408 are substantially the same as in the second exemplary embodiment shown in FIG. 15, and therefore the description thereof will be omitted.

Referring to FIG. 18, the control section 203 refers to received information about resource allocation and determines whether or not the pilot resource is allocated (step S402). At this time, if the pilot resource is not allocated (step S402: NO), the control section 203 determines whether or not a control signal notifying to cancel the resource request is received from the base station 100 (step S420). If such a notification is not received, the control section 203 terminates the process. If such a notification is received (step S420: YES), the control section 203 cancels the resource request (step S421). Then, for example, after a certain period of time has passed, the control section 203 transmits a resource request to the base station 100 again.

3.3) Advantages

As described above, according to the third exemplary embodiment of the present invention, in addition to the advantages of the first exemplary embodiment, the base station can take the initiative in controlling the transmission mode of the mobile station when the CQI-specific pilot resource is not allocated over a CQI measurement period or more. When the base station does not allocate the CQI-specific pilot resource in particular, the base station can reduce the control loads by having the mobile station cancel the resource request.

Note that although the case of notifying to cancel the resource request is described in the examples shown in FIGS. 17 and 18, the mobile station 200 may be controlled by using a control signal instructing of the channel-independent scheduling, CQI-specific pilot resource allocation wait, and the like described in the second exemplary embodiment.

4. Various Exemplary Aspects

The present invention can be applied to various uses including wireless communication systems, methods of transmitting a pilot signal to measure CQI, base stations, mobile stations, operation programs for a base station, and operation programs for a mobile station.

As described before, the first object of the present invention is to provide a mobile communications system, a channel quality measurement method, and a base station that enable efficient measurement of the channel quality of each mobile station.

Another object of the present invention is to provide a pilot resource allocation method in a mobile communications system by which a pilot resource can be efficiently allocated to each mobile station, as well as a base station using this method.

According to the present invention, to a mobile station which performs transmission of uplink data signal and/or control signal in any one of the plurality of frequency blocks, a pilot resource for demodulation is allocated. To a mobile station which waits for uplink data signal transmission scheduling, a pilot resource specific to channel quality measurement (also called "sounding reference resource") is allocated. Using the pilot resource for demodulation and/or the pilot resource specific to channel quality measurement, channel quality for each of the plurality of mobile stations is measured.

According to an exemplary embodiment, the pilot resource specific to channel quality measurement is allocated in a frequency block where the pilot resource for demodulation has not been allocated during a predetermined channel quality measurement period.

The pilot resource specific to channel quality measurement may be secured by a predetermined amount of resource in a predetermined pilot resource. When additional pilot resource is needed for allocation of the pilot resource specific to channel quality measurement, the pilot resource specific to channel quality measurement may be allocated by using a part of data resource for uplink data transmission as additional pilot resource.

According to another exemplary embodiment, when the pilot resource specific to channel quality measurement cannot be allocated, the base station transmits to the mobile station a notification that the pilot resource specific to channel quality measurement cannot be allocated. When receiving the notification, the mobile station selects its own transmission mode and transmits it to the base station. Accordingly the mobile station can take the initiative in selecting a transmission mode.

According to still another exemplary embodiment, when the pilot resource specific to channel quality measurement cannot be allocated, the base station selects transmission mode of the mobile station to notify the mobile station of the transmission mode. Accordingly the base station can take the initiative in selecting the transmission mode of the mobile station.

The present invention may be embodied in other specific forms without departing from the spirit or essential characteristics thereof. The above-described exemplary embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention claimed is:

1. A channel quality measuring method for measuring channel quality for each of a plurality of mobile stations at a base station in a frequency band including a plurality of frequency blocks, comprising:
determining whether or not a resource is allocated to a mobile station for a resource for an uplink data signal and/or a control signal;
a) when said determining step determines that the resource is to be allocated for the uplink data signal and/or the control signal to a mobile station, the mobile station performs transmission of the uplink data signal and/or the control signal in any one of the plurality of frequency blocks, and the base station attempts to allocate a demodulation pilot resource to the mobile station;
b) when said determining step determines that neither the resource for the uplink data signal nor the resource for the control signal is to be allocated to a mobile station, the mobile station waits for uplink data signal transmission scheduling, and when the frequency band includes any available block, the base station attempts to allocate a channel quality measurement-specific pilot resource specific to the mobile station; and
c) measuring channel quality for each of the plurality of mobile stations using the demodulation pilot resource and/or the channel quality measurement-specific pilot resource.

2. The channel quality measuring method according to claim 1, wherein the channel quality measurement-specific pilot resource is allocated in a frequency block where the demodulation pilot resource has not been allocated during a predetermined channel quality measurement period.

3. The channel quality measuring method according to claim 1, wherein the channel quality measurement-specific pilot resource is allocated by using a predetermined amount of resource secured in a predetermined pilot resource.

4. The channel quality measuring method according to claim 1, wherein when additional pilot resource is needed for allocation of the channel quality measurement-specific pilot resource, the channel quality measurement-specific pilot resource is allocated by using a part of data resource for uplink data transmission as additional pilot resource.

5. The channel quality measuring method according to claim 1, further comprising:
when the attempted allocation of the channel quality measurement-specific pilot resource in the step b) is not successful, the base station transmits to the mobile station a notification that the pilot resource specific to channel quality measurement cannot be allocated; and
when receiving the notification, the mobile station selects its own transmission mode and transmits it to the base station.

6. The channel quality measuring method according to claim 1, further comprising:
when the attempted allocation of the channel quality measurement-specific pilot resource in the step b) is not successful, selecting a transmission mode of the mobile station; and
notifying the mobile station of the transmission mode.

7. The channel quality measuring method according to claim 5, wherein the transmission mode includes cancellation of a data transmission request received from the mobile station, waiting for allocation of another channel quality measurement-specific pilot resource, and change of scheduling scheme.

8. The channel quality measuring method according to claim 6, wherein the transmission mode includes cancellation of a data transmission request received from the mobile station, waiting for allocation of another channel quality measurement-specific pilot resource, and change of scheduling scheme.

9. A channel quality measuring method in a mobile communications system performing channel-dependent scheduling by which a base station allocates data resource for data transmission to a plurality of mobile stations depending on their channel qualities, comprising:
a) classifying a pilot resource for pilot signal transmission demodulation into one of i) a demodulation pilot resource and ii) a measurement-specific pilot resource, wherein the demodulation pilot resource is used for a pilot signal for demodulation having a bandwidth equal to that of a data signal and/or a control signal, and wherein the measurement-specific pilot resource is used for a pilot signal specific to a channel quality measurement;
at the base station, determining whether or not a resource is allocated to a mobile station for a resource for an uplink data signal and/or a control signal;
b) initially setting a scheduling band for an arbitrary one of the plurality of mobile stations, wherein the scheduling band includes a plurality of frequency blocks, to which the channel-dependent scheduling is applied;
c) when said determining step determines that the resource is to be allocated for the uplink data signal and/or the control signal to a mobile station, the mobile station performs transmission of the uplink data signal and/or the control signal in any one of the plurality of frequency blocks, and the base station attempts to allocate a data resource to at least one of the plurality of frequency blocks, including allocating a first demodulation pilot resource having a bandwidth equal to a bandwidth of the data resource, to the mobile station;
d) when said determining step determines that the resource is to be allocated for the uplink data signal and/or the control signal to a mobile station, the mobile station performs transmission of the uplink data signal and/or the control signal in any one of the plurality of frequency blocks, and the base station attempts to allocate a control resource for a control signal transmission to at least one of the plurality of frequency blocks, including allocating a second demodulation pilot resource having a bandwidth equal to a bandwidth of the control resource, to the mobile station;
e) updating the scheduling band of the mobile station based on allocation of the data resource, the control resource and the demodulation pilot resource;
f) when said determining step determines that neither the resource for the uplink data signal nor the resource for the control signal is to be allocated to a mobile station, the mobile station waits for uplink data signal transmission scheduling, and when the frequency band includes any available block, the base station attempts to allocate, the measurement-specific pilot resource to a frequency block during a predetermined channel quality measurement period in the scheduling band;
g) notifying the mobile station of a resource control signal indicating allocation of the data resource, the control resource and the pilot resource;

at the mobile station, h) transmitting at least one of the demodulation pilot signal and the measurement-specific pilot signal to the base station using the resource control signal; and at the base station, i) measuring the channel quality of the mobile station using said at least one of the demodulation pilot signal and the measurement-specific pilot signal.

10. The channel quality measuring method according to claim 9, wherein in the step e), the base station maintains the scheduling band initially set in the step b).

11. The channel quality measuring method according to claim 9, wherein in the step e), the base station updates the scheduling band to at least one frequency block in which the data resource and/or the control resource have been allocated during the channel quality measurement period only after the scheduling band has been initially set in the step b).

12. The channel quality measuring method according to claim 9, wherein in the step e), the base station sequentially updates the scheduling band to at least one frequency block in which the data resource and/or the control resource have been allocated during each channel quality measurement period.

13. The channel quality measuring method according to claim 9, wherein in the step e), the base station updates the scheduling band to at least one frequency block in which the data resource has been allocated during the channel quality measurement period only after the scheduling band has been initially set in the step b).

14. The channel quality measuring method according to claim 9, wherein in the step e), the base station sequentially updates the scheduling band to at least one frequency block in which the data resource has been allocated during each channel quality measurement period.

15. The channel quality measuring method according to claim 9, wherein in the steps c), d) and f), the base station allocates the pilot resource to contiguous frequency blocks in the scheduling band for the mobile station, and wherein the mobile station performs single carrier transmission of the pilot signal in the contiguous frequency blocks.

16. The channel quality measuring method according to claim 9, wherein the base station secures a predetermined fixed amount of resource within the pilot resource as the measurement-specific pilot resource.

17. The channel quality measuring method according to claim 9, wherein in the steps c), d) and f), when available resource of the pilot resource is insufficient to accommodate mobile stations to which the measurement-specific pilot resource is to be allocated, an amount of pilot resource is adaptively controlled by using data resource as pilot resource.

18. The channel quality measuring method according to claim 9, wherein in the step g), the base station notifies the mobile station of the resource control signal every time allocating the measurement-specific pilot resource.

19. The channel quality measuring method according to claim 9, wherein in the step g), the base station notifies the mobile station of a pattern of resources to be allocated when the base station starts allocating the measurement-specific pilot resource and then notifies the mobile station of termination of the allocation of the measurement-specific pilot resource.

20. The channel quality measuring method according to claim 9, wherein in the step f), when the base station does not allocate the measurement-specific pilot resource over the channel quality measurement period or longer, the base station notifies the mobile station that the measurement-specific pilot resource is not allocated to the mobile station, and wherein the mobile station selects its own transmission mode in response to a notification that the measurement-specific pilot resource is not allocated to the mobile station and then notifies the base station of the transmission mode.

21. The channel quality measuring method according to claim 9, wherein in the step f), when the base station does not allocate the measurement-specific pilot resource over the channel quality measurement period or longer, the base station selects a transmission mode of the mobile station and then notifies the mobile station that the transmission mode.

22. The channel quality measuring method according to claim 20, wherein the transmission mode includes a mode of canceling a resource request, a mode of transmitting a data signal independently of channel quality, and/or a mode of waiting for allocation of the measurement-specific pilot resource.

23. The channel quality measuring method according to claim 21, wherein the transmission mode includes a mode of canceling a resource request, a mode of transmitting a data signal independently of channel quality, and a mode of waiting for allocation of the measurement-specific pilot resource.

24. A base station for communicating with each of a plurality of mobile stations in a frequency band including a plurality of frequency blocks, comprising:

a resource allocation controller for allocating a demodulation pilot resource to a mobile station which performs transmission of uplink data signal and/or control signal in any one of the plurality of frequency blocks, and for allocating a channel quality measurement-specific pilot resource to a mobile station which waits for uplink data signal transmission scheduling; and a channel quality measurement section for measuring channel quality for each of the plurality of mobile stations using the demodulation pilot resource and/or the channel quality measurement-specific pilot resource, wherein the resource allocation controller determining whether or not a resource is allocated to a mobile station for a resource for an uplink data signal and/or a control signal, and thereafter when said determining step determines that the resource is to be allocated for the uplink data signal and/or the control signal to a mobile station, the mobile station performs transmission of the uplink data signal and/or the control signal in any one of the plurality of frequency blocks, and the base station attempts to allocate a demodulation pilot resource to the mobile station, and when said determining step determines that neither the resource for the uplink data signal nor the resource for the control signal is to be allocated to a mobile station, the mobile station waits for uplink data signal transmission scheduling, and when the frequency band includes any available block, the base station attempts to allocate a channel quality measurement-specific pilot resource specific to the mobile station.

25. The base station according to claim 24, wherein the resource allocation controller allocates the channel quality measurement-specific pilot resource in a frequency block during a predetermined channel quality measurement period.

26. The base station according to claim 24, wherein the resource allocation controller allocates the channel quality measurement-specific pilot resource by using a predetermined amount of resource secured in a predetermined pilot resource.

27. The base station according to claim 24, wherein when an additional pilot resource is needed for allocation of the channel quality measurement-specific pilot resource, the resource allocation controller allocates the channel quality measurement-specific pilot resource by using a part of data resource for uplink data transmission as additional pilot resource.

28. The base station according to claim 24, further comprising a controller which determines whether it is possible to allocate the channel quality measurement-specific pilot resource, and when the determination is that the channel quality measurement-specific pilot resource cannot be allocated, transmits to the mobile station a notification that the channel quality measurement-specific pilot resource cannot be allocated, and performs operation control depending on a transmission mode received from the mobile station.

29. The base station according to claim 24, further comprising a controller which determines whether it is possible to allocate the channel quality measurement-specific pilot resource, and when the determination is that the channel quality measurement-specific pilot resource cannot be allocated, selects a transmission mode of the mobile station to notify the mobile station of the transmission mode.

30. The base station according to claim 28, wherein the transmission mode includes cancellation of a data transmission request received from the mobile station, waiting for allocation of channel quality measurement-specific pilot resource, and change of scheduling scheme.

31. The base station according to claim 29, wherein the transmission mode includes cancellation of a data transmission request received from the mobile station, waiting for allocation of the channel quality measurement-specific pilot resource, and change of scheduling scheme.

* * * * *